US009049740B1

(12) United States Patent
Tillotson et al.

(10) Patent No.: US 9,049,740 B1
(45) Date of Patent: Jun. 2, 2015

(54) METHODS AND SYSTEMS FOR RELAYING SIGNALS

(75) Inventors: Brian J. Tillotson, Kent, WA (US); Keith J. Glover, Kent, WA (US)

(73) Assignee: The Boeing Company, Chicago, IL (US)

( * ) Notice: Subject to any disclaimer, the term of this patent is extended or adjusted under 35 U.S.C. 154(b) by 664 days.

(21) Appl. No.: 13/444,278

(22) Filed: Apr. 11, 2012

Related U.S. Application Data

(63) Continuation-in-part of application No. 13/272,391, filed on Oct. 13, 2011, now Pat. No. 8,904,880.

(51) Int. Cl.
*H04B 3/36* (2006.01)
*H04B 7/14* (2006.01)
*H04W 88/04* (2009.01)

(52) U.S. Cl.
CPC ................................ *H04W 88/04* (2013.01)

(58) Field of Classification Search
USPC ............................................................ 455/7
See application file for complete search history.

(56) References Cited

U.S. PATENT DOCUMENTS

| | | | | |
|---|---|---|---|---|
| 4,716,417 | A  * | 12/1987 | Grumet | 343/708 |
| 2003/0164794 | A1* | 9/2003 | Haynes et al. | 342/353 |
| 2006/0054737 | A1* | 3/2006 | Richardson | 244/17.11 |
| 2008/0102814 | A1* | 5/2008 | Chari et al. | 455/424 |
| 2009/0055038 | A1* | 2/2009 | Garrec et al. | 701/17 |
| 2009/0135074 | A1* | 5/2009 | Yang et al. | 343/766 |
| 2009/0311046 | A1* | 12/2009 | Velsor | 404/95 |
| 2010/0045512 | A1* | 2/2010 | Nelson | 342/25 A |
| 2010/0283988 | A1* | 11/2010 | Mosier et al. | 356/4.01 |
| 2010/0299067 | A1* | 11/2010 | McCollough et al. | 701/301 |
| 2011/0134249 | A1* | 6/2011 | Wood et al. | 348/164 |
| 2011/0221934 | A1* | 9/2011 | Simon et al. | 348/240.3 |
| 2011/0307126 | A1* | 12/2011 | Hogstrom | 701/16 |
| 2013/0103232 | A1* | 4/2013 | Griffith | 701/2 |

* cited by examiner

*Primary Examiner* — Ankur Jain
(74) *Attorney, Agent, or Firm* — Armstrong Teasdale LLP

(57) ABSTRACT

An unmanned aerial vehicle (UAV) includes at least one passive reflective device having an elongated configuration defining a long axis and comprising a material configured to reflect radio signals. The UAV also includes a control system configured to control the UAV along a flight path that orients the at least one passive reflective device such that the long axis remains substantially tangential to an ellipsoid whose foci are at two points between which radio communication is desired.

20 Claims, 24 Drawing Sheets vertical polarization typical polarization horizontal
polarization vertical
polarization

METHODS AND SYSTEMS FOR RELAYING SIGNALS

CROSS REFERENCE TO RELATED APPLICATIONS

This application is a continuation-in-part application of U.S. patent application Ser. No. 13/272,391, filed 13 Oct. 2011 now U.S. Pat. No. 8,904,880, and titled "Methods and Systems for Low-Cost Aerial Relay," which is hereby incorporated by reference in its entirety.

BACKGROUND

The field of the disclosure relates generally to ground to ground radio communication issues with intervening obstacles between terminals, and more specifically, to methods and systems for relaying signals.

A continuing problem is the enablement of ground to ground radio communication despite intervening obstacles such as mountains or buildings that block radio signals. In certain cases, an aerial system is ideal to relay the signal from one party to another. For example, unmanned aerial vehicles (UAVs) incorporating electronic repeaters are used for high-value communication channels at echelons above the brigade or company level. However, electronic repeaters as UAV payloads can be heavy, power hungry, and expensive. These disadvantages make UAV repeaters unsuitable for everyday use at company or platoon level or for civil needs like police, fire, or border patrol.

One previous solution to the general problem includes electronic repeaters as payloads in UAVs as mentioned above. Other solutions include stationary repeater units placed on mountaintops or the roofs of buildings and/or radio reflecting satellites, such as NASA's Echo I. It would be desirable to achieve the benefits of an unmanned aerial relay without the disadvantages associated with the above listed electronic repeaters.

BRIEF DESCRIPTION

In one aspect, an unmanned aerial vehicle (UAV) is provided that includes at least one passive reflective device having an elongated configuration defining a long axis and comprising a material configured to reflect radio signals. The UAV also includes a control system configured to control the UAV along a flight path that orients the at least one passive reflective device such that the long axis remains substantially tangential to an ellipsoid whose foci are at two points between which radio communication is desired.

In another aspect, a method for relaying a radio signal between two points is provided that includes operating an unmanned aerial vehicle (UAV) including at least one passive reflective device configured to reflect radio signals, wherein the at least one passive reflective device has a long axis. The method also includes maintaining the UAV in a flight path such that the long axis remains substantially tangential to an ellipsoid whose foci are at two points between which radio communication is desired. The method further includes receiving a signal from a first of the two points, and reflecting at least a portion of the signal to a second of the two points by the at least one passive reflective device.

In yet another aspect, a communications system is provided that includes a first radio transceiver operable for deployment at a first point, a second radio transceiver operable for deployment at a second point, and an unmanned aerial vehicle (UAV). The UAV includes at least one passive reflective device having an elongated configuration defining a long axis and comprising a material configured to reflect radio signals. The UAV also includes a control system configured to control the UAV along a flight path that orients the at least one passive reflective device such that the long axis remains substantially tangential to an ellipsoid whose foci are at the first point and the second point.

The features, functions, and advantages that have been discussed can be achieved independently in various embodiments or may be combined in yet other embodiments further details of which can be seen with reference to the following description and drawings.

DETAILED DESCRIPTION

The embodiments described herein relate to a low-cost airborne relay for radio-frequency communication, where an unmanned aerial vehicle (UAV) reflects radio signals between two terminals. As described herein, the UAV is configured with one of more features that enhance RF reflection in selected orientations. Further, the UAV may be configured to fly one or more paths that optimize bistatic signal strength between the two terminals. In at least one embodiment, the features added to the UAV include passive RF reflectors, which in combination with special operating methods, serve as relays between terminals on the ground. The incorporation of passive RF reflectors reduces weight, power, electromagnetic interference (EMI), and costs, thereby allowing UAVs to be used as relays at lower military echelons and in civilian applications.

A simple physical embodiment of the system is first described herein, then an overview of a general method for using the system is described. Also described are the physics that enable the method, and finally specific methods corresponding to particular classes of applications are described.

Figure 1:
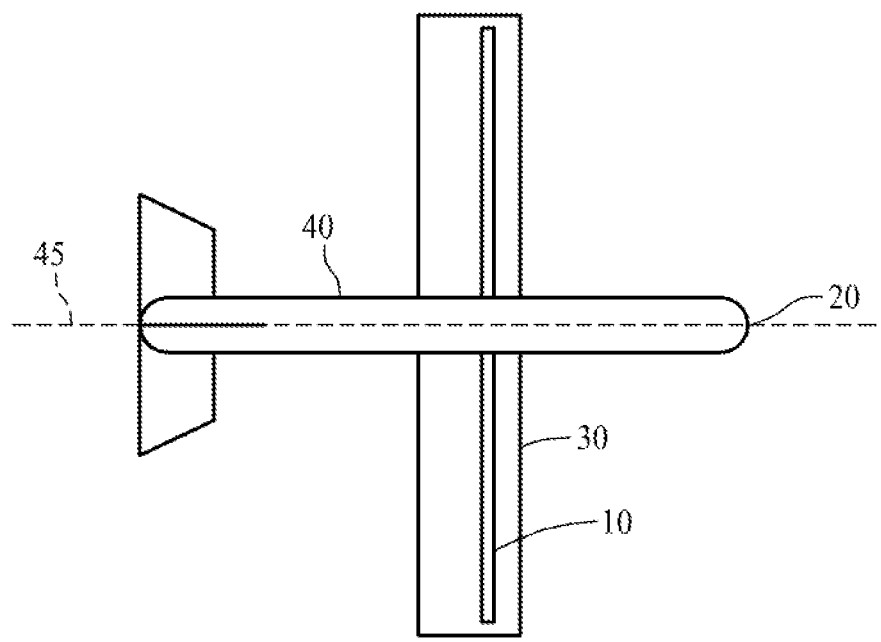
FIG. 1 illustrates a passive reflective device mounted on an underside of a wing of an unmanned aerial vehicle (UAV).

As shown in FIG. 1, at least one passive radio-frequency (RF) reflector, such as a passive reflective device 10, is mounted on an unmanned aerial vehicle (UAV) 20. In the particular embodiment illustrated, the passive reflective device 10 is mounted an underside of a wing 30 of the UAV 20 and substantially perpendicular to a fuselage 40 of the UAV 20. More specifically, the passive reflective device 10 is substantially perpendicular to a centerline axis 45 of the fuselage 40. Now referring to FIG. 2, passive reflective device 10 operates as a relay for a signal 50 that is to be transmitted from point A to point B. The use of the passive reflective device 10 allows signal 50 to circumvent an obstacle 60 between points A and B. In embodiments, the passive reflective device 10 is at least one elongated conductive strip, plate, or wire, with its long axis oriented parallel to the wing and with the specific material for the passive reflective device 10 selected to reflect radio-frequency signals. The passive reflective device 10 may serve additional functions, such as providing structural stiffness to the wing 30 of the UAV 20. Embodiments are contemplated in which the passive reflective device 10 is mounted substantially parallel to the fuselage 40 of the UAV 20. The flight patterns of such an embodiment are modified to be consistent with the flight pattern embodiments described herein.

Figure 3:
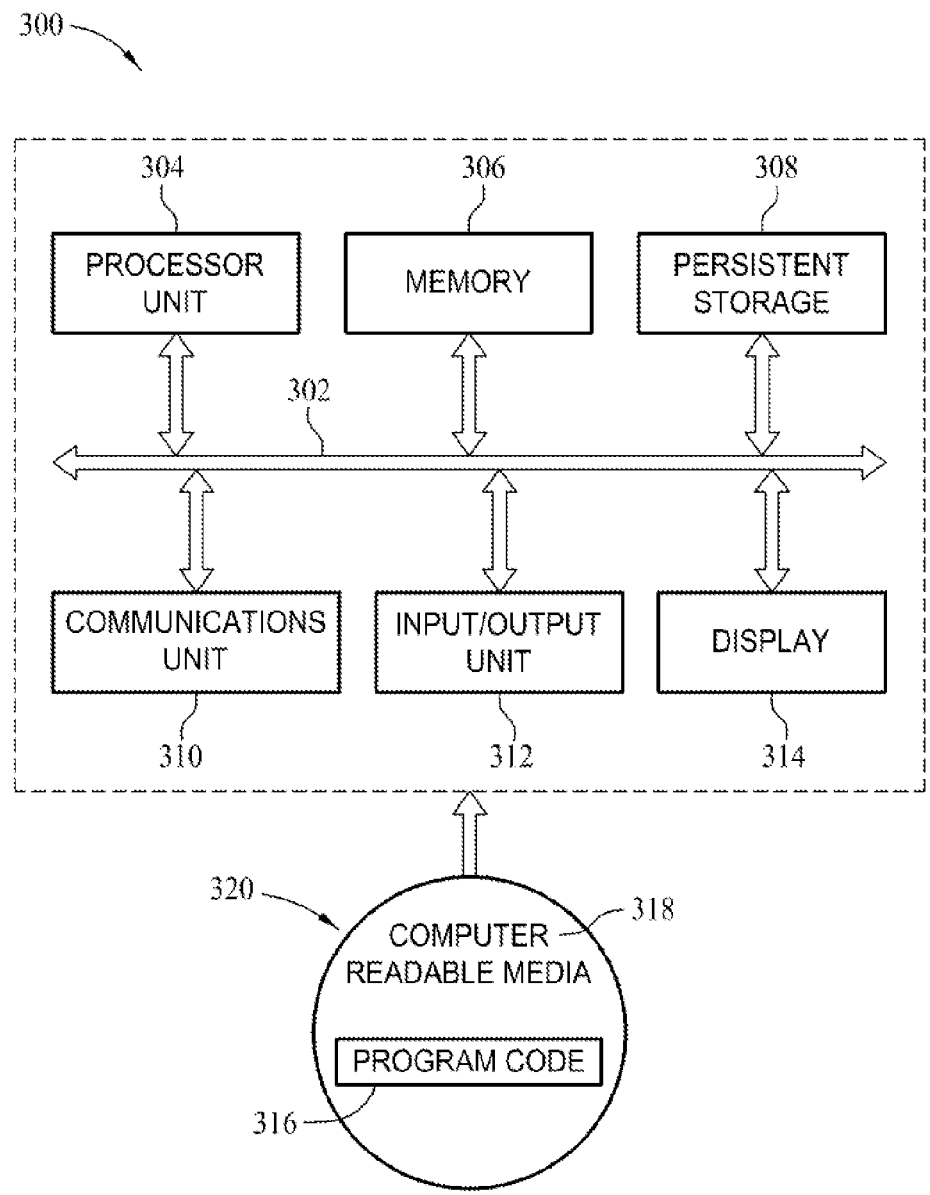
FIG. 3 is a block diagram of a data processing system.

Further embodiments relate to a control system that controls a flight path and orientation of the UAV 20 in accordance with the methods described in the following paragraphs. Initially, however, such a control system may be embodied as a data processing system 300 which is depicted in FIG. 3 in accordance with an illustrative embodiment. In this illustrative example, data processing system 300 includes communications fabric 302, which provides communications between processor unit 304, memory 306, persistent storage 308, communications unit 310, input/output (I/O) unit 312, and may include a display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Generally, the control system includes a computer configured to control flight control surfaces of the UAV 20, (e.g., ailerons, rudder, and elevator) and possibly a throttle of the UAV 20. The computer typically is programmed to know the locations of points A and B (and others), and is configured to receive updates of (i.e., data representative of) the location and orientation of the UAV 20 and/or of points A and B (if points A and/or B are mobile) from elements such as a UAV navigation system, an air traffic radar system, or other systems that provide one or both of location and orientation information. The control system may control the flight path of the UAV 20 based on the location and/or orientation of the UAV 20 and/or of points A and B. In one embodiment, the control system receives a control signal from a device remote from the UAV 20, and controls the flight path of the UAV 20 based on the control signal. Alternatively, the control system may be embodied as a skilled human operator with a control console, a radio link to the UAV, and a source of up-to-date information about locations of points A and B and the location and orientation of the UAV 20.

Figure 2:
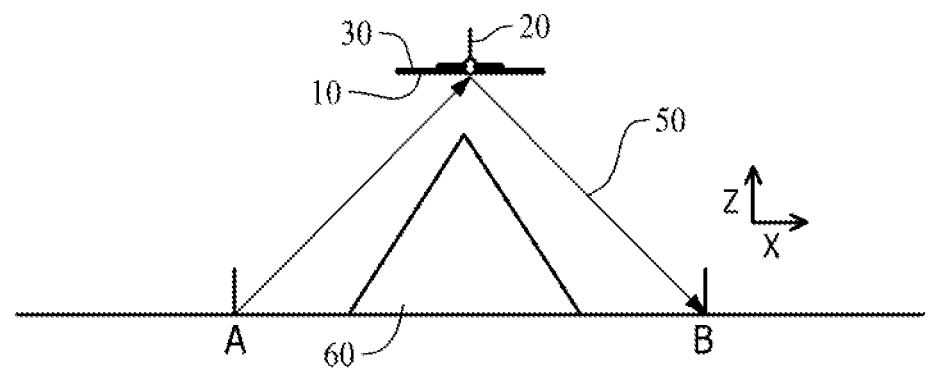
FIG. 2 illustrates the passive reflective device operating as a relay for a signal that is to be transmitted from point A to point B.

Referring again to FIG. 2, the UAV 20 flies a path that makes it visible (by radio) to points A and B. For example, no RF obstacles block the line of sight from point A to the UAV 20 or from the UAV 20 to point B, as shown in FIG. 2. As the UAV 20 flies its pattern, a terminal on the ground associated with point A transmits an RF signal which impinges on the reflective device 10. The signal is scattered in many directions, including towards point B. Point A and point B each includes a radio transceiver that receives and transmits RF signals.

One preferred method of operating the UAV 20 ensures that the signal scattered toward point B is at least strong enough for it to be received at point B and be understood by the receiver at point B. How to do this depends on the shape and size of the reflective device, the polarization of the radio signal, the relative positions of points A and B, and the velocity of any wind that affects the UAV 20. Various embodiments provide methods to deal with these different situations.

Figure 4:
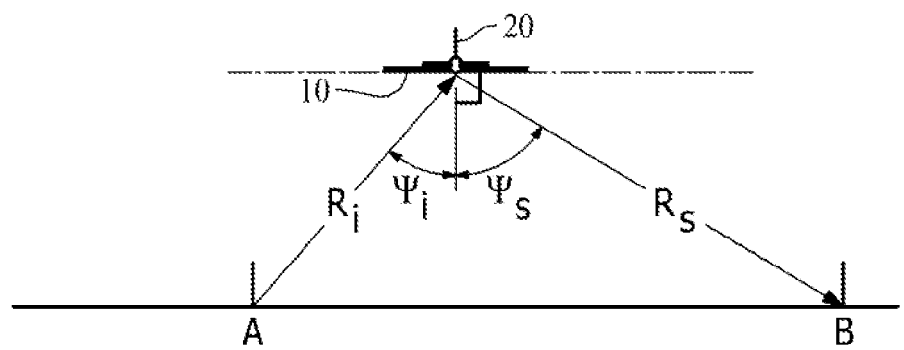
FIG. 4 illustrates range parameters $R_i$ and $R_s$ and angle parameters $\psi_s$ and $\psi_i$ from point A to the UAV to point B.

The power received by the receiver at point B is described by the formula, $P_{rcvr}=C/R_{eq}^2$, where C is a constant that depends on transmit power, antenna gains, and radio wavelength, and $R_{eq}$ is the "equivalent range" from point A to point B. The equivalent range is defined as $R_{eq}=R_i\,R_s\,(4\pi/\sigma)^{1/2}$, where, as shown in FIG. 4, $R_i$ is the range from Point A to the UAV 20 (i.e., range of incident radiation), $R_s$ is the range from the UAV 20 to Point B (i.e., range of scattered radiation), and σ is the bistatic scattering cross section of the reflective device 10 on the UAV 20.

The bistatic scattering cross section depends on the wave number $k_0$ (which is inversely proportional to the radio wavelength) and on the geometry of the device. For illustration purposes, it is assumed that the reflective device 10 is a long, thin wire, for example, a wire stretched from wing tip to wing tip inside the plastic skin of the UAV 20. The bistatic scattering cross section, σ, of a wire scattering a plane wave is given by the following equation:

$$\sigma(\Psi_i, \Psi_s) = 4\pi h^2 \frac{\cos^2(\Psi_s)}{\cos^2(\Psi_i)} \cos^2(\gamma_i)\cos^2(\gamma_s)$$
$$\left[\frac{1}{\ln^2(0.8905 k_o a) + \frac{\pi^2}{4}}\right] \sin x^2\{k_o h(\sin(\Psi_i) + \sin(\Psi_s))\}$$

where 2h is the length of the wire, a is the radius of the wire, $\Psi_s$ and $\Psi_i$ are directions of incident and scattered wave propagation relative to broadside (see FIG. 4), $\gamma_s$ and $\gamma_i$ are polarization of incident and scattered electric fields relative to wire axis, and sin x (z)=sin(z)/z.

Figure 5:
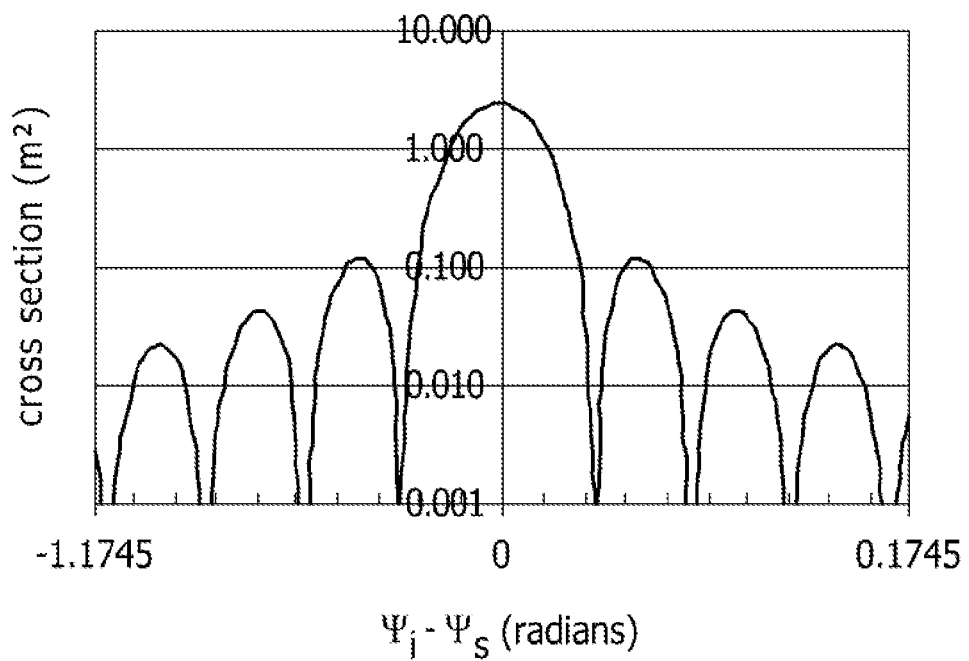
FIG. 5 illustrates variation of bistatic scattering cross section, $\sigma$, with $\psi_s$ minus $\psi_i$ where each tick mark is one degree and the vertical scale is logarithmic.

FIG. 5 is an example of how σ varies with T. In most situations, the central peak occurs when $\Psi_i$ is within a degree or two of $-\Psi_s$, for example, when the waves are specularly reflected. In such cases, waves reflected from each point along the wire travel roughly the same total number of wavelengths from Point A to Point B so they interfere constructively at the receiving antenna. The first null occurs where $k_0$ h $(\sin(\Psi_i)+\sin(\Psi_s))=\pi$, that is, where waves reflected from each point along the wire are exactly half a wavelength out of phase with waves reflected from another point along the wire. They destructively interfere and cancel each other at the receiving antenna.

The described methods associated with this disclosure keep the wire (or other reflective device) positioned and oriented so that values of $\Psi_i$ and $\Psi_s$ stay near the central peak thereby maintaining strong reflections from Point A to Point B, and from Point B to Point A, for two-way communications links. At a minimum, the methods avoid values of $\Psi_i$ and $\Psi_s$ corresponding to nulls on either side of the central peak.

Figure 6:
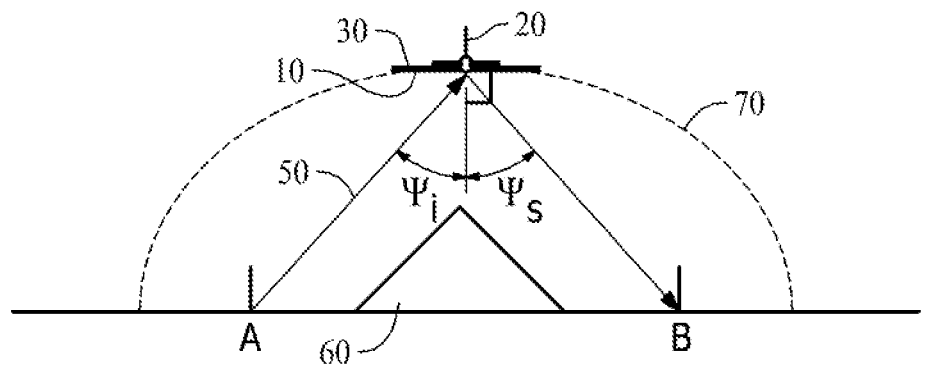
FIG. 6 illustrates that a reflection from a surface parallel to an ellipsoid ensures signal from one focus (A) reaches other focus (B).

$\Psi_i$ and $\Psi_s$ can be sufficiently optimized by orienting the UAV 20 so the long axis of the reflective device 10 lies on an ellipsoid whose foci are at Point A and Point B. If the device is two-dimensional, e.g., a plate rather than wire, then its short axis should also lie on the ellipsoid. Any ellipsoid has the property that a ray from either focus, reflecting specularly from the ellipsoid, will reach the other focus. Aligning the reflective device with the surface of the ellipsoid ensures that the signal from Point A undergoes a specular reflection toward Point B, corresponding to $\Psi_i=-\Psi_s$, as in FIG. 6 which illustrates a reflection from a surface parallel to an ellipsoid 70 ensuring signal 50 from one focus (point A) reaches other focus (point B).

The above paragraphs therefore describe a method for maintaining an UAV (i.e., the reflective device 10) in an orientation with respect to points A and B by maintaining the passive reflective device 10 in an orientation such that a product of a square of the cosine of a first angle between the reflective device 10 and a vertical incident polarization vector between the two points and a square of the cosine of a second angle between the reflective device 10 and a vertical scattered polarization vector between the two points is minimized.

Figure 7A:
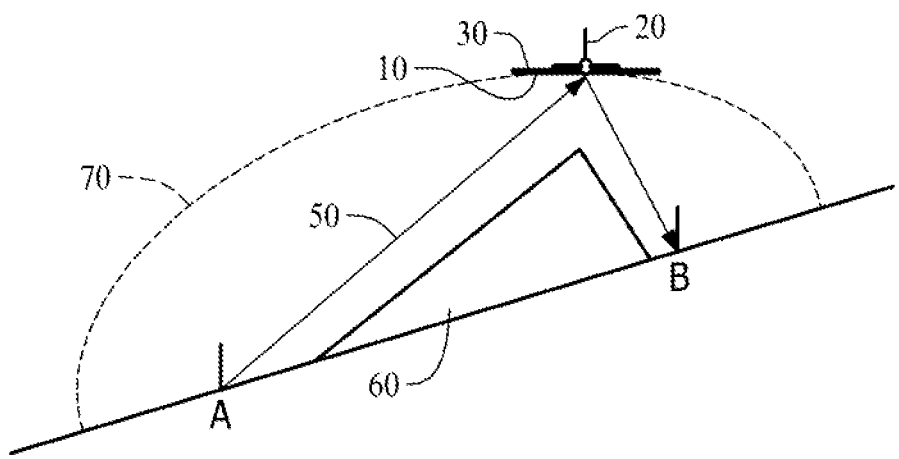
FIG. 7A illustrates a UAV positioned to minimize $R_A \times R_B$ while avoiding blockage of RF path and that the ellipsoid need not be horizontal.
Figure 7B:
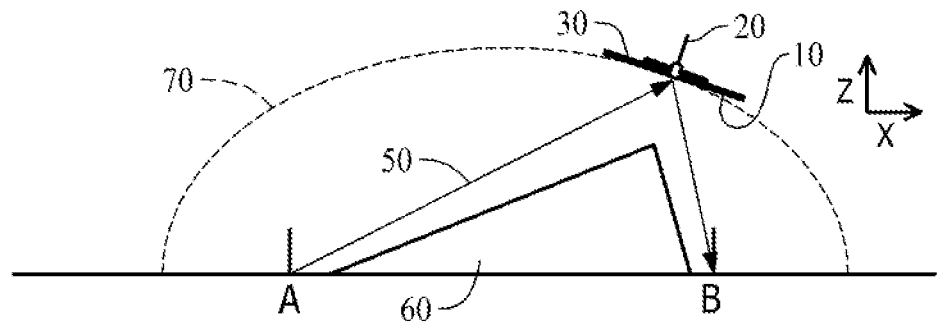
FIG. 7B illustrates a UAV positioned to minimize $R_A \times R_B$ while avoiding blockage of RF path and that the reflective device (and wing) of the UAV need not be horizontal.

The received power is further optimized by positioning the UAV 20 to minimize the equivalent range between points A and B, via the UAV, subject to the constraint of having a clear line of sight past any obstacles. Embodiments addressing this are shown in FIG. 7. Flying with a tilted wing 30 as FIG. 7B reduces aerodynamic efficiency, but may be an effective communication choice in some situations. Summarizing, FIG. 7 illustrates UAV 20 positioned to minimize the equivalent range while avoiding blockage of the RF path. FIG. 7A illustrates the ellipsoid 70 need not be horizontal. FIG. 7B illustrates that the reflective device 10 (and wing 30) need not be horizontal.

Figure 8:
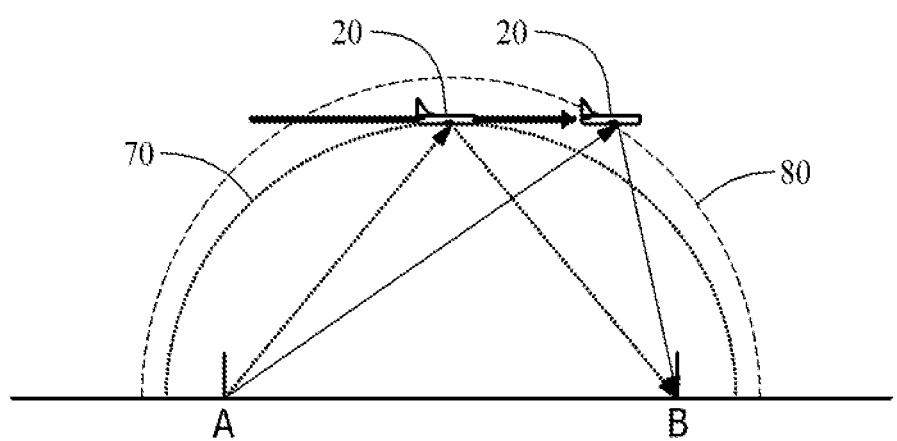
FIG. 8 illustrates the UAV shown flying a level path where at each point the passive reflective device is on the surface of a different ellipsoid with foci at points A and B.

Note that though "the ellipsoid" has been referred to herein, the term is local and ever-changing. Wherever the UAV 20 happens to be, there is exactly one ellipsoid which passes through a given point in the UAV 20 and which has points A and B as foci. The reflective device 10 should be oriented to lie on the surface of that local ellipsoid 70. As the UAV 20 moves to a new location, generally a different ellipsoid 80 will pass through the UAV 20 and have points A and B as foci, as illustrated in FIG. 8 where the UAV 20 is shown flying a level path. At each point, the UAV, or more correctly the passive reflective device 10, is on the surface of a different ellipsoid 70, 80 with foci at points A and B.

The general methods discussed thus far maintain the reflective device 10 lying within (or nearly within) the surface of an ellipsoid to give the best combination of angles $\Psi_i$ and $\Psi_s$. Specific methods are needed to deal with angles $\gamma_i$ and $\gamma_s$ which relate the RF electric field's polarization direction to the axis of the reflective device 10, which in one embodiment is a wire. The incident signal's electric field cannot induce a current in the wire if the field is perpendicular to the wire; it can only induce currents parallel to the electric field, hence the $\cos^2(\gamma_i)$ in the equation given above. Likewise, the induced current can only create a scattered electric field parallel to the current, hence the $\cos^2(\gamma_s)$ in equation given above. To optimize with respect to γ, polarization must be accounted for.

All radio transmissions are polarized. Any polarization mode can be described as a linear combination of horizontal, vertical, right-hand circular, or left-hand circular polarization. The best method of operating the UAV 20 depends on the polarization used. Three methods are described corresponding to polarization that is horizontal, vertical, or circular (whether right-hand or left-hand makes no difference for this level of description). Given these examples, persons skilled in the art will be able to derive best methods corresponding to polarizations that are a combination of horizontal and vertical. Likewise, although the equations used to describe reflective devices with different shapes (e.g., cylinders or rectangular plates) are different than the equation used herein, persons skilled in the art will be able to find or derive such equations and, using them, derive best methods to operate a UAV 20 equipped with those reflective devices.

Method for Horizontal Polarization

Figure 9A:
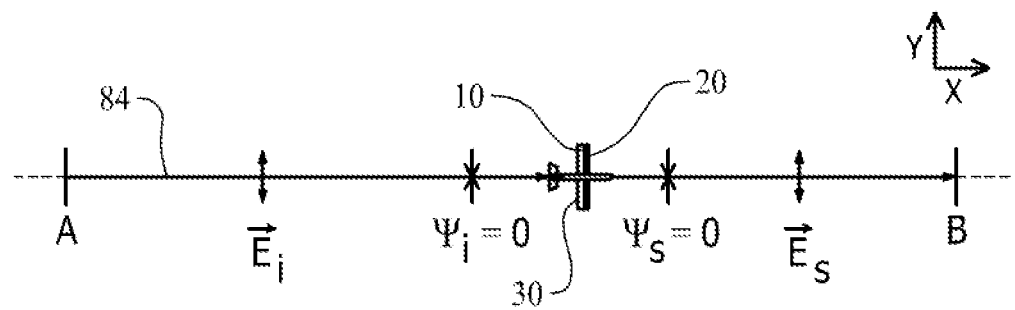
FIG. 9A is a top view of the UAV illustrating polarization vectors E of incident and scattered signals.
Figure 9B:
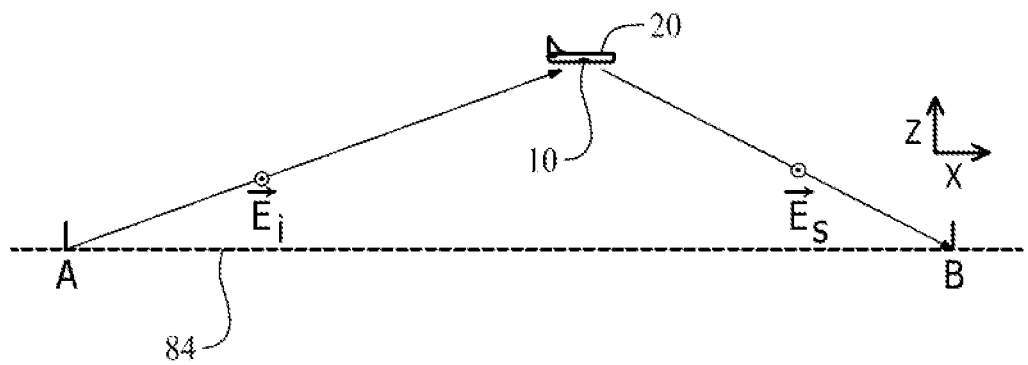
FIG. 9B is a side view of the UAV illustrating polarization vectors E of incident and scattered signals.
Figure 9C:
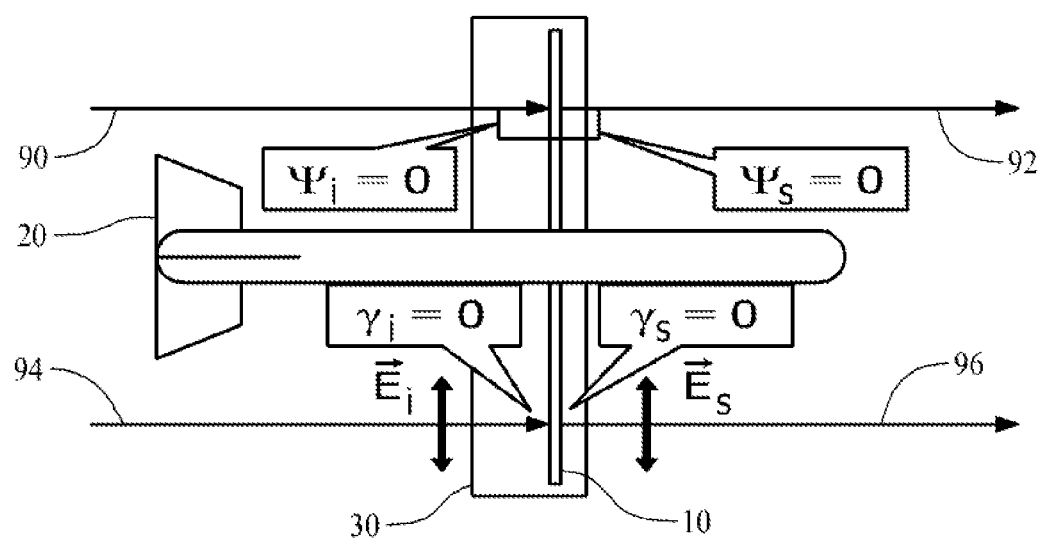
FIG. 9C is a close-up top view of polarization vectors E, propagation angles $\Psi$ relative to the passive reflective device axis, and polarization angles $\gamma$ relative to an axis of the reflective device.

For horizontal polarization, the long axis of the reflective device on the UAV 20 should be (a) horizontal to keep $\gamma_i$ and $\gamma_s$ near zero, and (b) perpendicular to A-B (the axis 84 from Point A to Point B) to keep $\Psi_i$ and $\Psi_s$ near zero. A simple example that satisfies this criterion is UAV 20 flying with wings 30 level, parallel to and directly above the A-B axis 84 as shown in FIGS. 9A and 9B. The incident and scattered rays are perpendicular to the wire axis, so $\Psi_i=\Psi_s=0$. Thus the $\Psi$-dependent parts of the equation given above are maximized. The horizontal electric field vector is parallel to the wire axis, so $\gamma_i=\gamma_s=0$. Thus the $\gamma$-dependent parts of the equation given above are maximized. Summarizing, FIG. 9A is a top view of the UAV 20 illustrating polarization vectors E of incident and scattered signals. FIG. 9B is a side view, and FIG. 9C is a close-up top view of polarization vectors E, propagation angles $\Psi$ relative to wire axis, and polarization angles $\gamma$ relative to an axis of the reflective device 10. FIG. 9C further illustrates incident radiation 90 that is perpendicular to the reflective device 10, scattered radiation 92 that is perpendicular to the reflective device 10, incident polarization 94 that is parallel to the reflective device 10, scattered polarization 96 that is parallel to the reflective device 10.

Figure 10A:
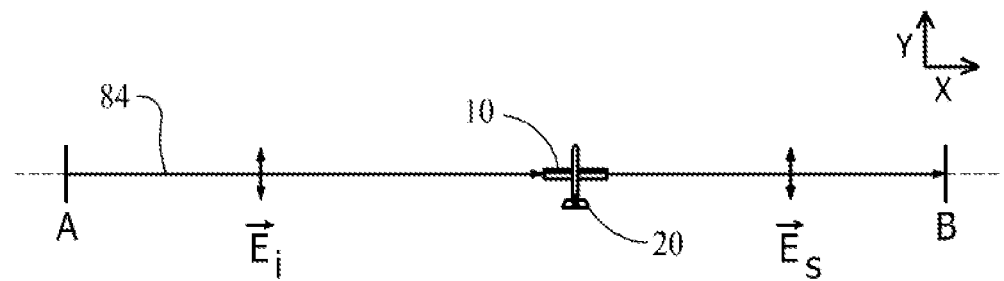
FIG. 10A is a top view showing polarization vector E of incident and scattered signals with the reflective device parallel to the AB axis.
Figure 10B:
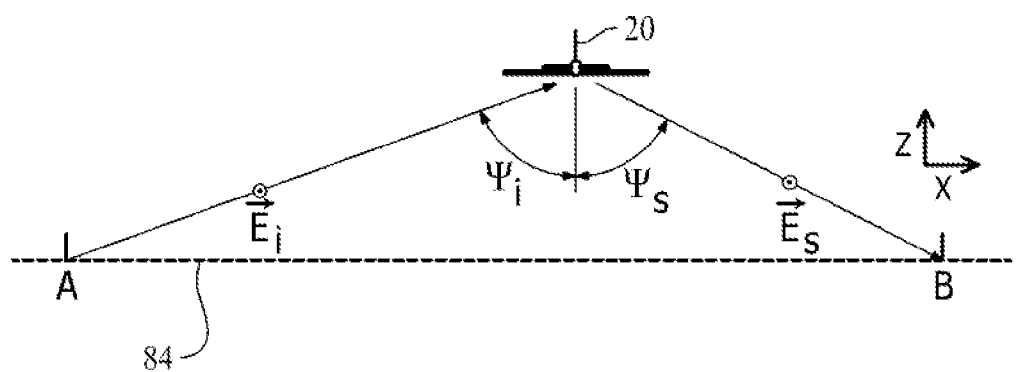
FIG. 10B is a side view showing polarization vector E of incident and scattered signals with the reflective device parallel to the AB axis.
Figure 10C:
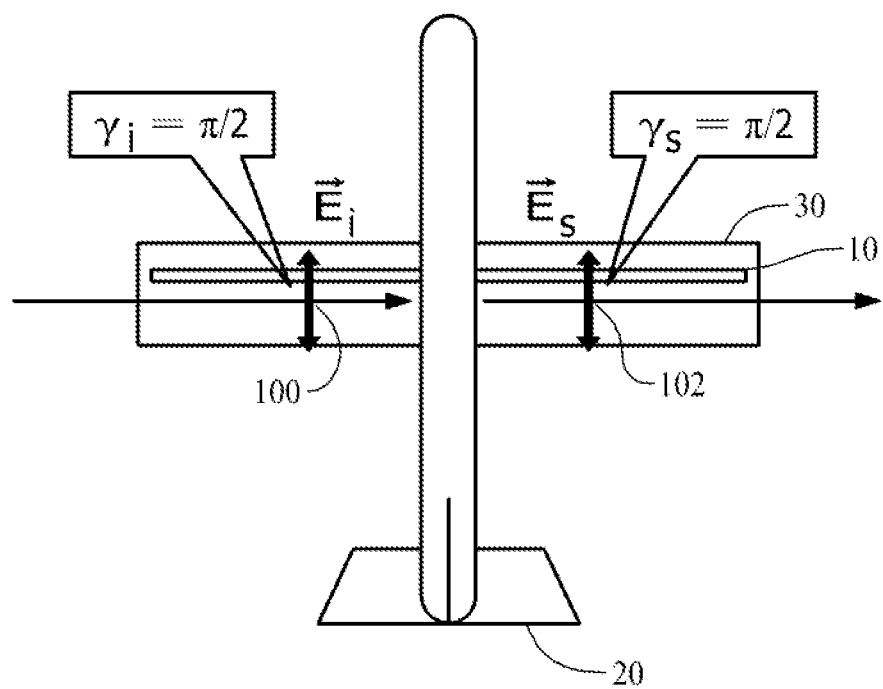
FIG. 10C is a close-up top view showing polarization vector E of incident and scattered signals with the reflective device parallel to the AB axis.

Contrast the above to a scenario where the UAV 20 flies perpendicular to the A-B axis 84 and directly above it as shown in FIG. 10. FIG. 10 represents is a counterexample, not an illustrative embodiment. Then in general, $\Psi_i \neq \Psi_s$ and both angles are far from zero, so the I-dependent parts of the equation given above are small. Worse, the electric field vectors are perpendicular to the wire axis, so $\gamma_i=\gamma_s=\pi/2$. Thus the $\Psi$-dependent parts of equation 1 are zero. The scattering cross section is zero and no signal reaches Point B. Summarizing, FIG. 10 is a counterexample to the described embodiments with the reflective device 10 parallel to the AB axis. FIG. 10A is a top view showing polarization vector E of incident and scattered signals. FIG. 10B is a side view and FIG. 10C is a close-up top view that illustrates incident radiation 100 that is perpendicular to the reflective device 10, scattered radiation 102 that is perpendicular to the reflective device 10.

Figure 11:
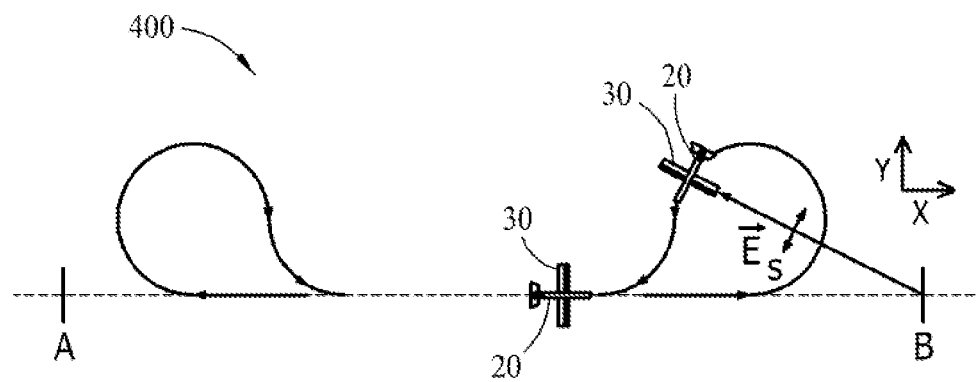
FIG. 11 is a top view of a race track pattern showing wings of the UAV perpendicular to electric field, E, during a turn.

Continuing the example of FIG. 9, the UAV 20 cannot fly forever in the same direction, lest it pass out of range of Point A's and Point B's radios. Therefore, the UAV 20 should eventually turn around and travel between Point A and Point B in the opposite direction. But if it does a conventional turn, there will be periods during the turn when the reflective device 10 is perpendicular to the incident or scattered electric field and no signal will reflect from Point A to Point B, as shown in FIG. 11, which is a top view of a race track pattern 400 showing wings 30 perpendicular to electric field, E, during a turn. At these times, communication from Point A to Point B will cease.

Figure 12A:
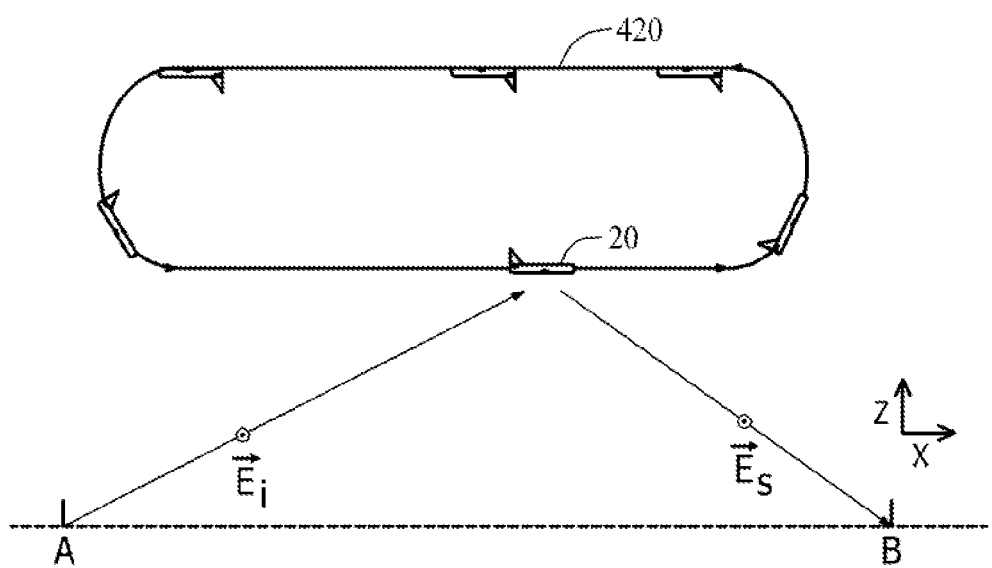
FIG. 12A is a side view that illustrates the UAV performing a half loop, pitching through 180°, and flying inverted along its return path.
Figure 12B:
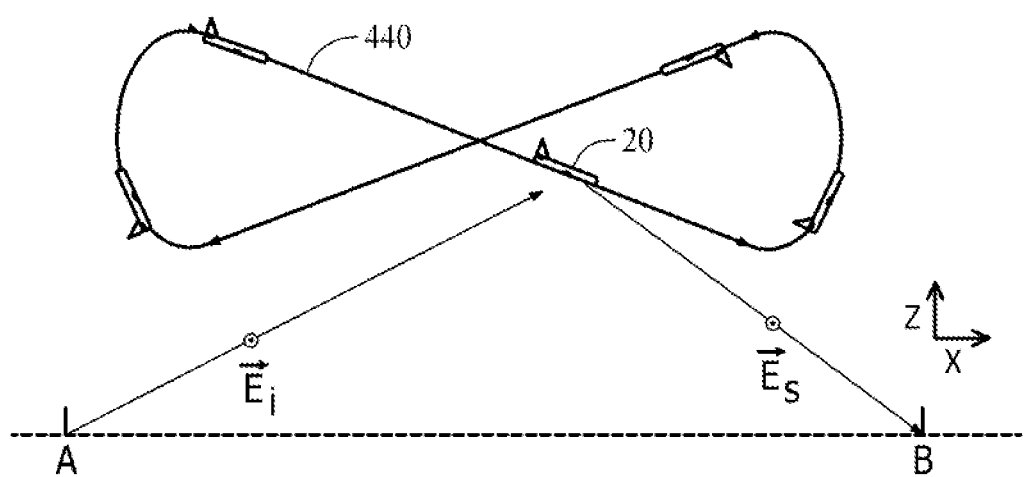
FIG. 12B is a side view that illustrates an alternative flight pattern where the UAV pitches in the same direction at both ends of its flight pattern.

To solve this problem, one embodiment calls for the UAV 20 to perform a half loop, pitching through 180° and flying inverted along its return path as shown in FIG. 12. At the other end of its pattern 420, UAV 20 performs another half loop and flies right side up. With this pattern, the reflective device 10 is always properly oriented to give the maximal reflection from Point A to Point B. FIG. 12A is a side view that illustrates that the UAV 20 pitches up at one end of its flight pattern and down at the other end of the flight pattern 420. FIG. 12B is a side view that illustrates that the UAV 20 pitches in the same direction at both ends of its flight pattern 440. Other embodiments may use such a FIG. 8 path, pitching the same direction (up or down) at both ends and climbing or descending along both paths as in FIG. 12B. Note that long-duration inverted flight is uncomfortable for human pilots, but not uncomfortable or difficult for many small UAVs. In either case, the passive reflective device 10 disposed in or on the wing 30 is always parallel to the horizontal E fields.

The examples discussed here are chosen for simplicity and clarity of illustration. The UAV 20 need not fly exactly parallel to the A-B axis, nor exactly above it, nor keep the UAV's wings exactly level. So long as $\Psi_i$ roughly equals $-\Psi_s$ and the wings are not close to vertical orientation, there will be good transmission from Point A to Point B.

Method for Vertical Polarization

Figure 13A:
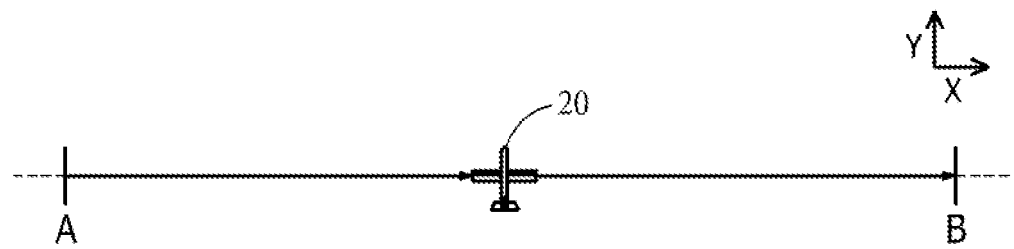
FIG. 13A is a top view that illustrates vertical polarization compensation by placing the reflective device at a position and orientation where it is at least partly aligned with the polarization vector.
Figure 13B:
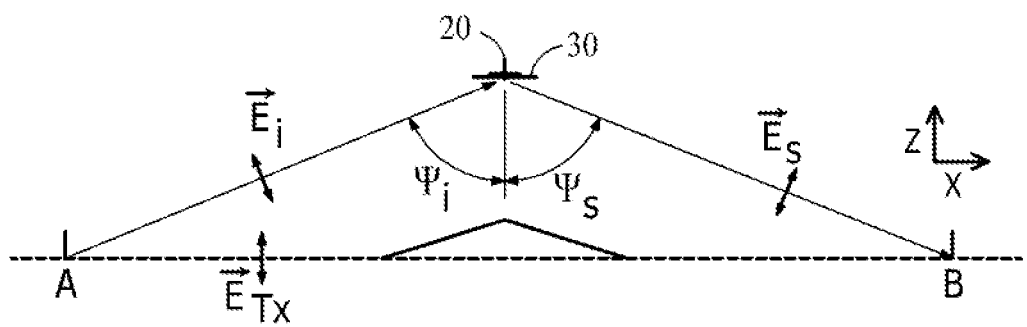
FIG. 13B is a side view that illustrates vertical polarization compensation by placing the reflective device at a position and orientation where it is at least partly aligned with the polarization vector.
Figure 13C:
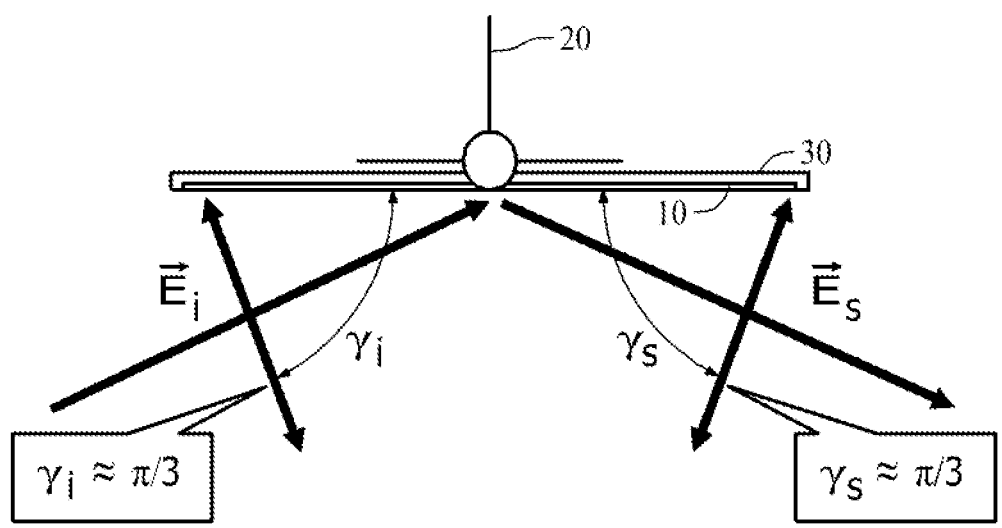
FIG. 13C is a close-up side view of polarization vectors E and polarization angles γ relative to the axis of the passive reflective device.

Most mobile military radios use vertical polarization, such that the electric field at the transmitter oscillates in the vertical direction. To give optimal reflection, the long axis of the reflective device on the UAV 20 should be vertical (in addition, either Point A or Point B should be higher than the UAV 20). Such a configuration is not practical for a reflective device embedded in the wing of a UAV as the wing must be non-vertical at least some of the time to produce lift. Embodiments for vertical polarization compensate by placing the reflective device at a position and orientation where it is at least partly aligned with the polarization vector. An example is shown in FIG. 13 where FIG. 13A is a top view illustrating polarization vector E of incident and scattered signals. FIG. 13B is a side view and FIG. 13C is a close-up side view of polarization vectors E and polarization angles $\gamma$ relative to the axis of the passive reflective device.

Like the embodiment for horizontal polarization, the wing 30 lies parallel to the surface of the ellipsoid which passes through the UAV 20 and has Point A and Point B at its foci. Unlike the embodiment for horizontal polarization, the UAV 20 flies perpendicularly across the Point A-to-Point B axis and stays between Point A and Point B, not flying directly over either of them. As shown, this orients the reflecting device so that $\Psi_i$ roughly equals $-\Psi_s$ and neither has a value very close to $\pi/2$. This ensures that the Y-dependent factors in the equation given above are not very small. More subtly, this orientation, together with the UAV's elevated position, ensures that $\gamma_i$ and $\gamma_s$ are substantially less than $\pi/2$. This ensures that the $\gamma$-dependent factors in the equation given above are not very small. The key to keeping angles $\gamma_i$ and $\gamma_s$ substantially less than $\pi/2$ is that the polarization vector, although nominally vertical at the transmit antenna, is perpendicular to the propagation direction at large distances from the transmitter. Thus the incident polarization vector $\overline{E}_i$ is tilted away from the vertical when it reaches the UAV 20, and is therefore not perpendicular to the axis of the passive reflective device 10. Likewise the scattered polarization vector $\overline{E}_s$ is tilted away from the vertical when it departs the UAV 20.

Contrast this to a case (not shown in the Figures) where the UAV 20 flies parallel to the AB axis, directly above it. Then $\gamma_i$ and $\gamma_s$ are both $\pi/2$, so the scattering cross section is zero and no signal reaches Point B.

Continuing the example of FIG. 13, the UAV 20 cannot fly forever in the same direction, lest it pass out of range of Point A and Point B radios. Therefore, the UAV 20 should turn around and pass between Point A and Point B in the opposite direction. But if the UAV 20 does a conventional turn, there will be periods during the turn when the reflective device 10 is perpendicular to the incident or scattered electric field or when $\Psi_i$ is quite different from $-\Psi_s$. At these times, communication from Point A to Point B will cease.

Figure 14A:
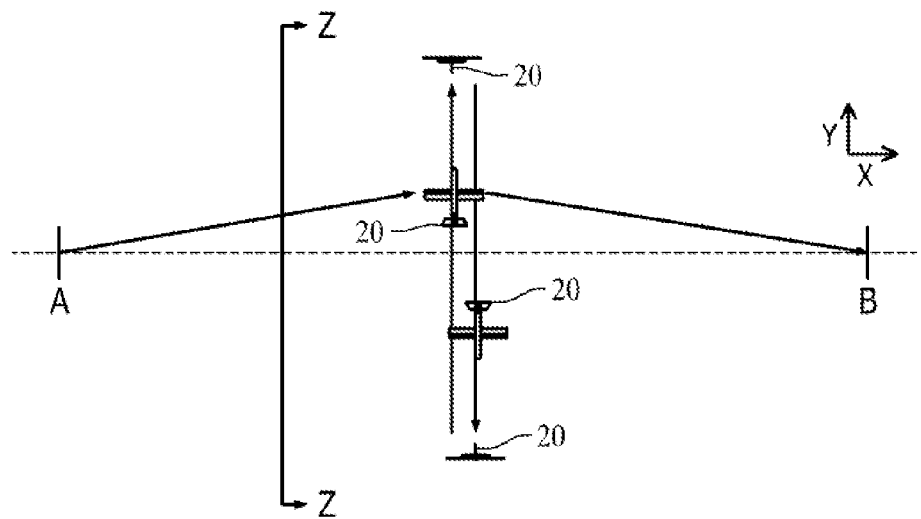
FIG. 14A is a top view illustrating the UAV performing a half loop, pitching through 180° and flying inverted along its return path perpendicular to the AB axis.
Figure 14B:
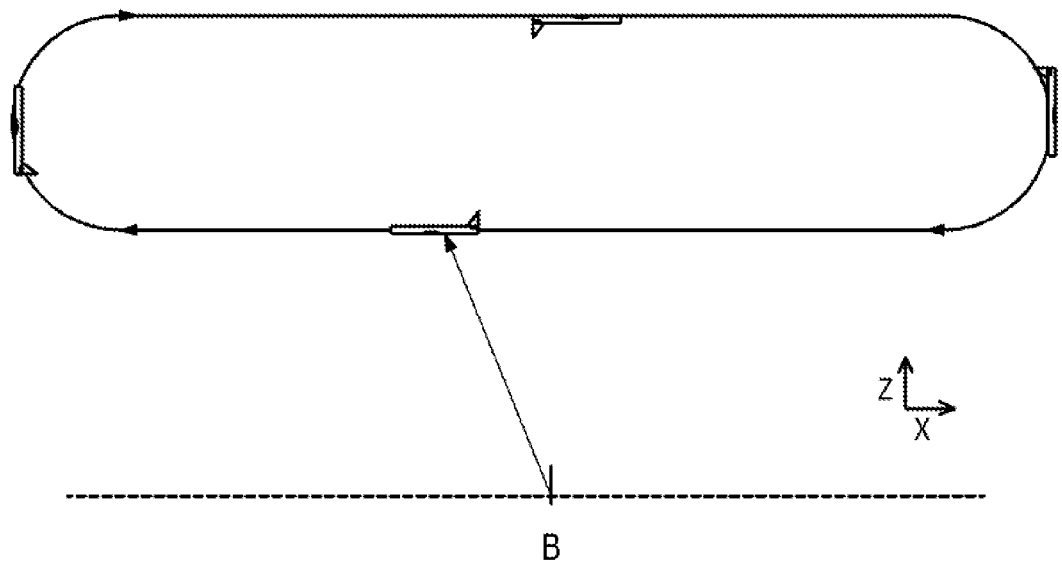
FIG. 14B is a section view illustrating the UAV performing a half loop, pitching through 180° and flying inverted along its return path perpendicular to the AB axis, looking from Z-Z along the A-B axis.

To solve this problem, in one embodiment, the UAV 20 performs a half loop, pitching through 180° and flying inverted along its return path perpendicular to the AB axis. At the other side of its pattern, the UAV 20 performs another half loop and flies right side up, which is shown in FIG. 14. With this pattern, the reflective device 10 is always properly oriented to give the maximal reflection from Point A to Point B. Alternatively, the UAV 20 may fly a vertical FIG. 8 pattern, pitching in the same direction (up or down) at each end of the path. Summarizing, FIG. 14A is a top view and FIG. 14B is a section view, looking from Z-Z along the A-B axis. UAV 20 pitches up at one end of the flight pattern and down at the other. The passive reflective device 10 in wing 30 is always horizontal and parallel to the A-B axis, thereby not becoming parallel to vertical E fields.

The example discussed herein is chosen for simplicity and clarity of illustration. The UAV 20 need not be halfway between Point A and Point B. If it is closer to Point A, say, then the UAV 20 may operate with one wing lower than the other and fly a curved path along the surface of the ellipsoid with foci at Point A and Point B. At every point on this path, the reflective device 10 in the wing 30 remains parallel to the surface of the ellipsoid and in the same plane as the A-B axis. As in the simpler example, the UAV 20 performs a half loop at each end of its flight pattern, but in this case the half loop is not strictly vertical; rather, the UAV 20 pitches in a direction perpendicular to the surface of the ellipsoid. A flight path with the UAV 20 continually climbing and descending and with its wings 30 continuously tilted is not fuel-efficient in still air, but a flight path like this may give the most efficient radio communication in some cases by reducing the effective range from Point A to Point B.

Method for Handling Crosswinds

Figure 15A:
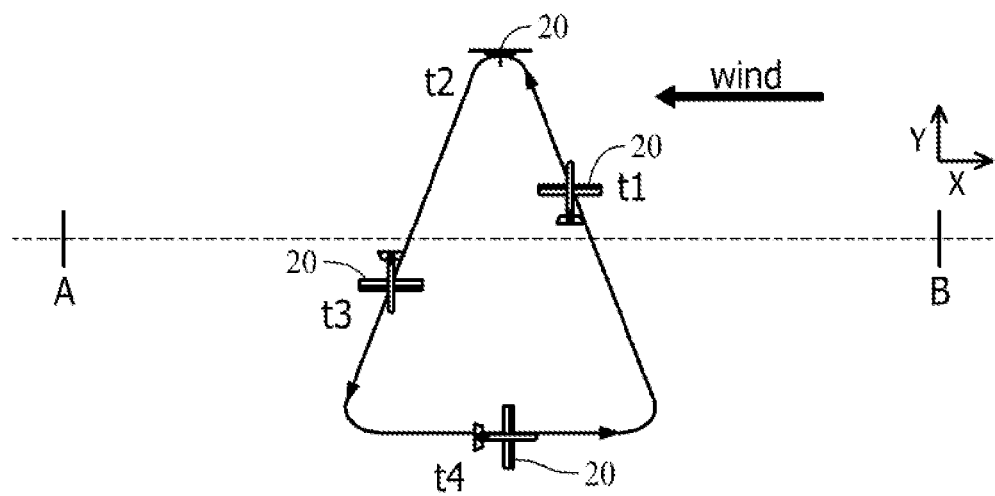
FIG. 15A illustrates that a single UAV must fly with a specified orientation, that a prolonged crosswind may blow the UAV out of position, and that correcting its position may require the UAV to briefly abandon its relay mission and fly upwind.
Figure 15B:
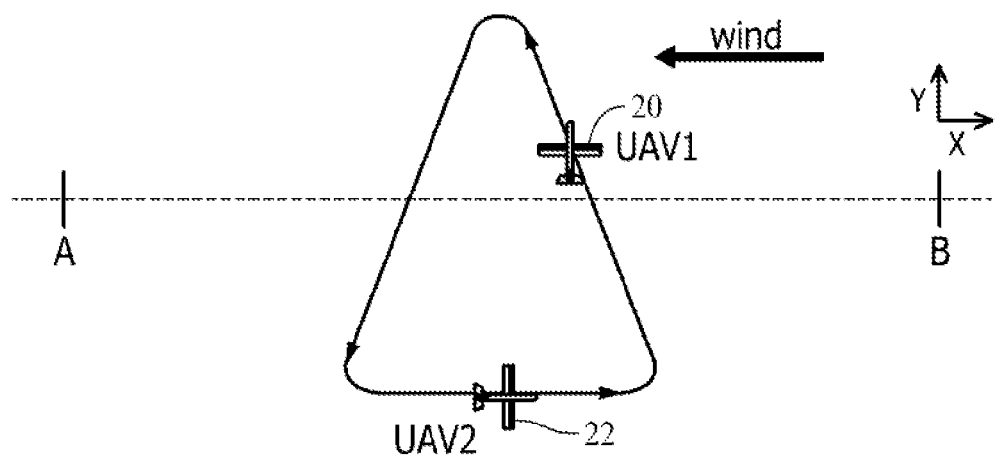
FIG. 15B illustrates an embodiment where multiple UAVs fly the same path, but with different timing so they remain out of phase with each other.

The methods described above assume that the UAV 20 flies in the direction it is pointed, for example, crosswind speeds are no more than a small fraction of the true airspeed of the UAV 20. In stronger winds, additional methods may be required. Unlike typical applications where an aircraft can "crab" into the wind to maintain a specified ground track, the UAV 20 must fly with a specified orientation to maintain an adequate bistatic scattering cross section. As a result, a prolonged crosswind may blow the UAV 20 out of position. Correcting its position may require the UAV 20 to briefly abandon its relay mission and fly upwind, as shown in FIG. 15A. In some cases, a temporary loss of relay function is acceptable. In other cases, however, is necessary to use an embodiment with two or more UAVs 20, 22. The UAVs 20, 22 each fly the same path, but with different timing so they remain out of phase with each other, for example, while one UAV 20 is flying the upwind leg, another UAV 22 is in position to reflect signals from Point A to Point B as shown in FIG. 15B. Therefore, FIG. 15A illustrates a single UAV 20 shown at four points in time. At t4, it cannot provide strong reflection from Point A to Point B. FIG. 15B illustrates two UAVs 20, 22 at a single moment in time. At least one UAV 20, 22 is always in position to provide strong reflection.

The same two-UAV method is useful when Point A, Point B, or both are moving, for example, riding in vehicles. In that case, the wind may be zero, but the flow of air relative to Point A and Point B may be treated as equivalent to wind.

Note that the two-UAV method of FIG. 15B does not necessarily encumber any single user with a need to operate and maintain two separate UAVs 20, 22 in the field. Communication always occurs between at least two users, and it is reasonable for each military or civil unit with a radio (i.e. Point A, Point B, or their colleagues) to also support one small UAV 20. It is contemplated that the UAVs 20 suitable for performing the embodiments described herein are typically small enough to be disassembled and carried in a backpack, herein referred to as being man portable, along with an operator console and all needed maintenance equipment.

Method for Adjusting Polarization

Figure 16A:
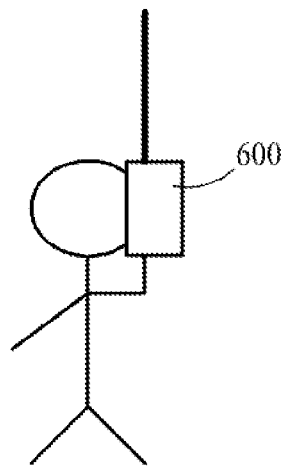
FIG. 16A illustrates a handheld radio which includes an antenna nominally designed to be held vertically.
Figure 16B:
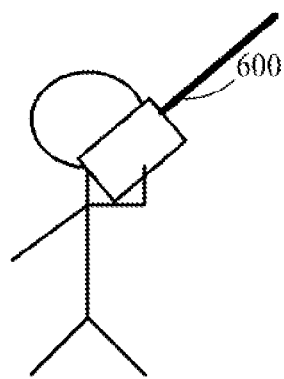
FIG. 16B illustrates the handheld radio and that the antenna is usually held at an angle.
Figure 16C:
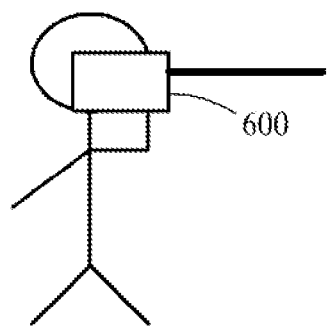
FIG. 16C illustrates that the handheld radio can be fairly easily rotated to produce horizontal polarization with the antenna.

As noted earlier, most mobile military radios nominally use vertical polarization. For some situations where users desire to apply the presently described embodiments, horizontal polarization might be more appropriate or easier to use because of constraints on the position or orientation of the UAV. It is easy to "convert" most military radios to horizontal polarization by the simple expedient of tilting or flexing the antenna. FIG. 16 illustrates how a handheld radio 600, nominally designed to be held vertically (FIG. 16A), in fact is usually held at an angle that produces diagonal polarization (FIG. 16B), and can be fairly easily rotated to produce horizontal polarization (FIG. 16C). Rotating to fully horizontal may not be necessary in most cases: diagonal polarization has a vertical component and a horizontal component, so diagonally polarized signals work reasonably well with methods for either vertical or horizontal polarization.

Figure 17A:
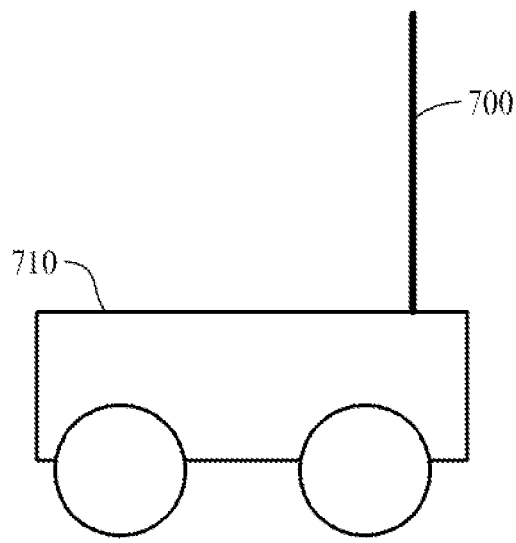
FIG. 17A illustrates a vertical whip antenna for a ground vehicle.
Figure 17B:
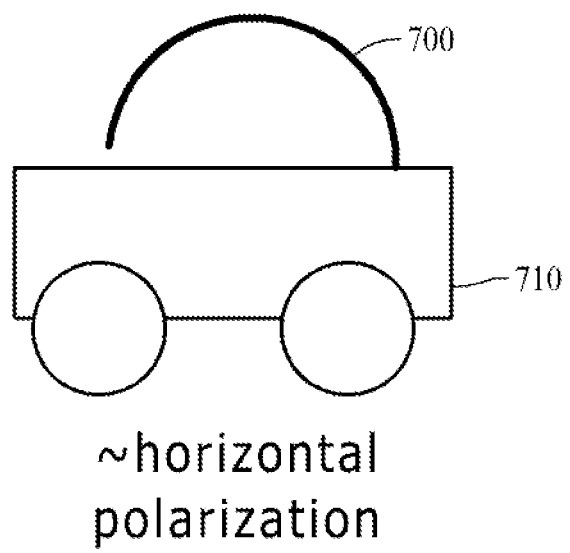
FIG. 17B illustrates that the antenna for the ground vehicle can be flexed to produce roughly horizontal polarization.

FIG. 17 illustrates how a whip antenna 700 for a ground vehicle 710, nominally designed to be mounted vertically (FIG. 17A), can be flexed to produce roughly horizontal polarization (FIG. 17B). Soldiers in the field frequently flex the antenna 700 and tie the tip to the chassis of vehicle 710 so the antenna is not damaged by collisions with trees or low bridges. This changes the principal polarization from vertical to horizontal.

In a typical military application, points A and B would be on opposite sides of a mountain reaching 3000 feet above local terrain with a roughly 45° slope on each side. The UAV 20 would fly a modest distance above the hilltop where it is visible to both points A and B. One analysis concluded that a UAV-mounted reflective device provided 15 dB of link margin for communications between points A and B. However, this analysis assumed certain parameters for the reflective wire and for the radio as illustrated in the table below. The described embodiments utilize a shorter wire that would fit within the wingspan of a hand-launched UAV 20, a thinner wire to reduce weight, and radio parameters corresponding to radios currently utilized at a data rate consistent with voice-only communications, as also shown in the Table.

| Parameter | Prior value | Current value | Change from 15 dB margin |
|---|---|---|---|
| Length of wire | 20 m | 2 m | −20 dB |
| Transmit power | 1 watt | 20 watt | +13 dB |
| Wire radius | 5 mm | 0.5 mm | −4.7 dB |
| Frequency | 500 MHz | 1.8 GHz | +2.1 dB |
| Data rate | 250 kbps | 25 kbps | +10 dB |
| Total | | | +0.4 dB |

As shown, the result is a slight improvement in link margin from 15 dB to 15.4 dB. The central peak of the scattering pattern is 4.6° wide from null to null, or about 3.9° wide between the points where power drops 15 dB from the peak value. A UAV autopilot with rapid response in its roll control loop can keep the wings (including the passive reflective device) steady to within a 3.9° band more than 95% of the time under typical weather conditions. This is adequate availability for voice communication.

Further improvement in link margin may be attained by (a) using a hollow (or plastic-filled) wire with larger radius, but with the same weight as the wire described herein, and/or (b) using two or more wires parallel to each other and separated by a distance on the order of one wavelength. The latter solution imposes some pitch constraints on the UAV: both the nose-to-tail axis and the wing-to-wing axis must lie in the local ellipsoid passing through the UAV with foci at points A and B.

Figure 18A:
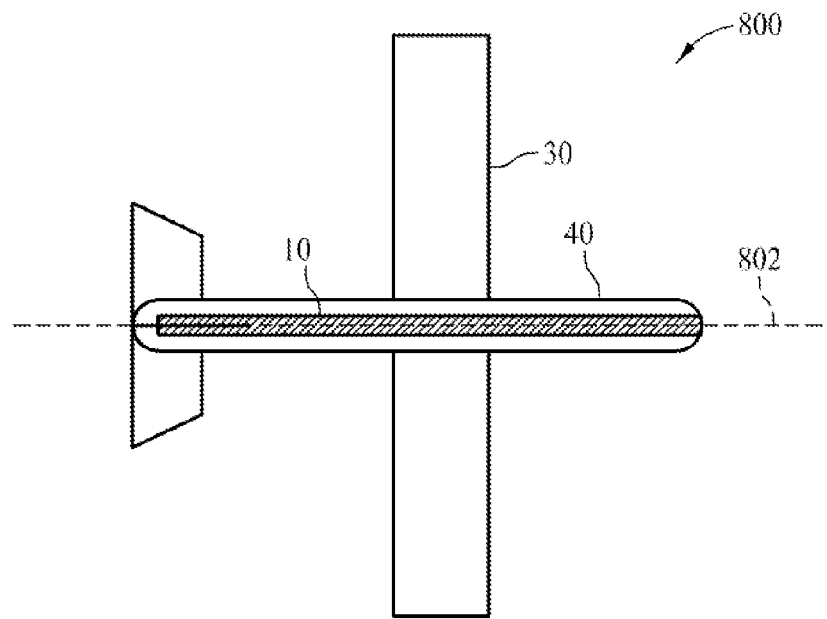
FIG. 18A illustrates a UAV that includes a passive reflective device positioned within the fuselage of the UAV.
Figure 18B:
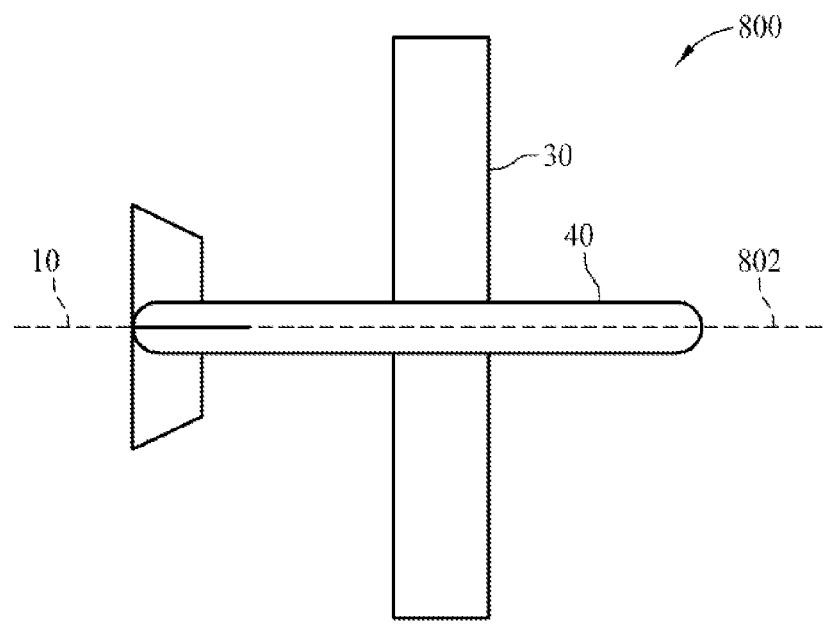
FIG. 18B illustrates the UAV that includes the passive reflective device coupled to, and extending from, the fuselage of the UAV.

FIGS. 18A and 18B illustrate a UAV 800 that includes at least one passive reflective device 10 positioned alongside, and/or substantially parallel to, the fuselage 40. Unless otherwise specified, UAV 800 is similar to UAV 20 (shown in FIG. 1), and similar components are labeled in FIGS. 18A and 18B with the same reference numerals used in FIG. 1.

Referring to FIG. 18A, the passive reflective device 10 includes at least one elongated conductive strip, plate, and/or wire and is manufactured from a material selected to reflect radio-frequency signals, such as the signal 50. The passive reflective device 10 is positioned within, and/or is coupled to, the fuselage 40 such that an axis 802 (i.e., a long or longitudinal axis) of the passive reflective device 10 is substantially parallel to the centerline axis 45 (shown in FIG. 1) of the fuselage 40. In one example, the passive reflective device 10 may serve additional functions, such as providing structural stiffness to the UAV 800. In another example, at least a portion of the UAV 800, such as at least a portion of the fuselage 40, is coated with, or is manufactured from, a material that reflects RF signals, such that the RF reflective portion of the UAV 800 is oriented substantially parallel to centerline axis 45.

Referring to FIG. 18B, the passive reflective device 10 may include a wire or another RF reflective device that at least partially trails or extends behind the UAV 800. The passive reflective device 10 may be permanently attached to the fuselage 40, or the device 10 may be detachable from the fuselage 40 to enable the UAV 800 to be used for other applications when not serving as an aerial relay. The passive reflective device 10 may be any length and may actually be longer than the UAV fuselage 40, for example. Passive reflective device 10 may include an aerodynamic device, such as a cone, positioned at an end to facilitate improving stability, rigidity, and/or lift of device 10 and/or of UAV 800.

In one embodiment, a length of the passive reflective device 10 may be adjusted. For example, the UAV 800 may include a spool that enables the passive reflective device 10 to be selectively retracted and stored within fuselage 40. The reflective device 10 may be extended and/or retracted manually, by a spring-loaded actuator, and/or by an electric or a hydraulic actuator, for example. Accordingly, a length of the passive reflective device 10 may be selectively adjusted by a user and/or by the UAV 800. In another embodiment, the UAV 800 may include a fixture that enables wires or other passive reflective devices 10 of different sizes, thicknesses, and/or lengths to be attached and/or removed from the UAV 800.

The length of the passive reflective device 10 extending from the fuselage 40 corresponds to the term 2h in the bistatic scattering cross section equation described above with respect to FIG. 2. Increasing the length (i.e. increasing 2h) affects the scattering cross section, σ, in two ways. First, increasing the length of the passive reflective device 10 increases the cross section at the peak (where $\Psi_i=\Psi_s$) (shown in FIG. 5) by a factor of $h^2$. Second, increasing the length of passive reflective device 10 narrows the angular width of the peak by a factor of h. Thus, a longer reflective device 10 can facilitate increasing the power of the signal reflected from point A to point B, but tighter constraints on the orientation control of the UAV 800 may be imposed.

The thickness of the passive reflective device 10 corresponds to the term 2a in the bistatic scattering cross section equation described above. A thicker reflective device 10 leads to increased cross section, and therefore increased reflection of the signal transmitted from point A to point B. However, a thicker reflective device 10 may impose added weight and drag which may displace fuel at launch, increase fuel burn during cruise, and thereby reduce overall flight duration.

A suitable passive reflective device 10 is selected and coupled to the UAV 800 based on factors including: the expected distance from point A to point B, the positions (and corresponding distances) at which the UAV 800 can obtain a line of sight (by radio signal) to both points A and B, weather-related turbulence that may reduce the precision with which the control element can maintain the orientation of the UAV 800, the radio frequency (or frequencies) at which points A and B will communicate, the power of the transmitter of point A, the sensitivity of the receiver at point B, and the tolerance for frequent landing to refuel or recharge the UAV 800.

Figure 19:
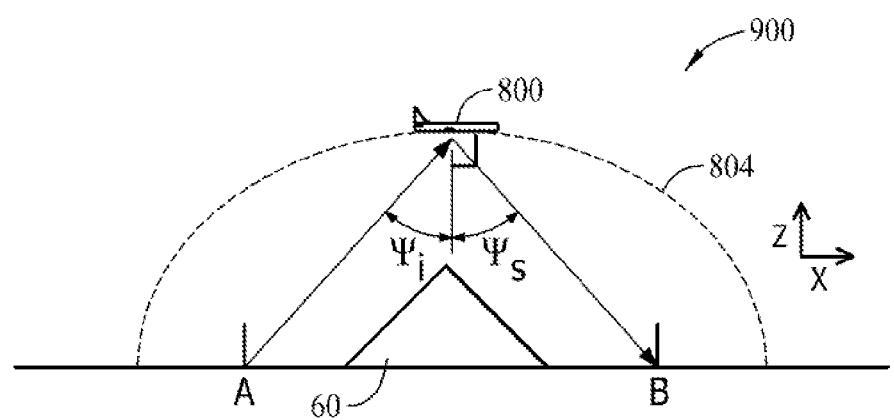
FIG. 19 illustrates a flight path of the UAV shown in FIGS. 18A and 18B that facilitates enabling communication from point A to point B.

FIG. 19 illustrates an exemplary flight path 900 of the UAV 800 that enables communication from point A to point B around an obstacle 60. The passive reflective device 10 is positioned and oriented such that values of $\Psi_i$ and $\Psi_s$ of the bistatic scattering cross section equation described above stay near the central peak of the scattering pattern (shown in FIG. 5), i.e. $\Psi_i$ and $\Psi_s$ are nearly equal in magnitude and opposite in sign, to provide strong signal reflections between points A and B. Values of $\Psi_i$ and $\Psi_s$ are avoided that correspond to nulls on either side of the central peak.

The values for $\Psi_i$ and $\Psi_s$ can be optimized by orienting the UAV 800 such that the long axis 802 of the passive reflective device 10 lies on an ellipsoid 804 whose foci are at points A and B. As used herein, an ellipsoid is a 3D shape produced by rotating an ellipse about its major axis. An ellipsoid has the property that a ray from either focus, reflecting specularly from the ellipsoid, will reach the other focus. Aligning the passive reflective device 10 to be tangential with the surface of the ellipsoid 804 enables the signal from point A to undergo a specular reflection toward point B such that $\Psi_i=-\Psi_s$.

The power of the signal received at point B is increased by positioning the UAV 800 to minimize the product of $R_i$ and $R_s$, subject to the constraint of having a clear line of sight (by radio signal) past any obstacles 60. This is satisfied as described above, where the control system (i.e., data processing system 300 (shown in FIG. 3)) controls the UAV 800 to fly as close as it safely can to the obstacle 60.

It should be understood that, as described above, the ellipsoid 804 may be constantly changing. Wherever the UAV 800 is located, there is exactly one ellipsoid which passes through a given point in the UAV 800 and which has points A and B as foci. The passive reflective device 10 should be oriented tangentially to that ellipsoid. As the UAV 800 moves to a new location, a different ellipsoid may pass through the UAV 800 and have points A and B as foci (as shown in FIG. 8, for example).

Accordingly, to obtain a suitable combination of angles $\Psi_i$ and $\Psi_s$, the passive reflective device 10 is maintained in an orientation that is substantially tangential to the surface of an ellipsoid 804 having points A and B as foci. However, specific methods are needed to address angles $\gamma_i$ and $\gamma_s$ which relate the RF electric field's polarization direction to the axis 802 of the passive reflective device 10. As described above, the incident signal's electric field cannot induce a current in the passive reflective device 10 if the field is perpendicular to the device 10. Rather, the signal can only induce a current when the passive reflective device 10 is substantially parallel to the electric field. Likewise, the induced current can only create a scattered electric field that is substantially parallel to the current. To optimize the value of γ, the methods must account for the polarization of the signal.

Method for Horizontal Polarization

Figure 20A:
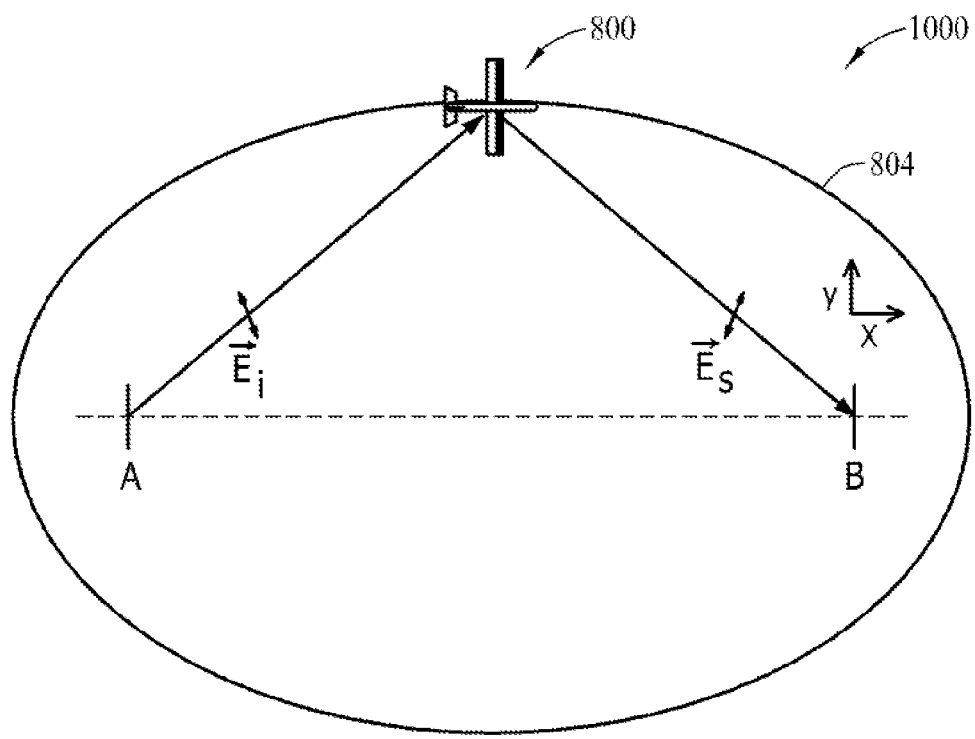
FIG. 20A is a side view that illustrates a flight path for the UAV shown in FIGS. 18A and 18B to enable communication between points A and B using horizontally polarized signals.

FIG. 20A is a side view of an exemplary flight path 1000 for the UAV 800 that enables communication using horizontally polarized signals. More specifically, the flight path 1000 is used to orient passive reflective device 10 to enable points A and B to communicate using horizontal polarized signals. For horizontal polarization, the long axis 802 of the passive reflective device 10 should be substantially horizontal to minimize $\gamma_i$ and $\gamma_s$, and be substantially tangential to the ellipsoid 804 having foci at points A and B and passing through the UAV 800 to keep $\Psi_i$ equal to, or substantially equal to, $-\Psi_s$.

As illustrated in FIG. 20A, the control system enables the UAV 800 to fly along an elliptical flight path 1000 that is substantially tangential to the ellipsoid 804 at a substantially constant altitude. At the substantially constant altitude, the UAV 800 flies within a single geometric plane. It should be recognized that the intersection of a plane with an ellipsoid is an ellipse. Therefore, with no wind, the UAV 800 flies the elliptical flight path 1000, or any other elliptical flight path that enables the passive reflective device 10 to be substantially tangential to the ellipsoid 804. The elliptical flight path 1000 is selected to be at a height that gives a clear line of radio transmission from point A to each point on the ellipse, and from each point on the ellipse to point B, and is selected to have a width that prevents the ground track of the ellipse (i.e., the projection of the ellipse onto the ground) from crossing a line segment connecting points A and B. Moreover, the selected elliptical flight path 1000 should be low enough and narrow enough to keep the product of $R_i$ and $R_s$ small enough to deliver adequate power to the receiver at point B.

In one embodiment, if a single UAV 800 cannot maintain communication at locations distant from points A and B, a user may choose to either tolerate occasional dropouts in the signal communication between points A and B, or to include a second UAV 800. In such an embodiment, the second UAV 800 is controlled to fly in the same flight path 1000 as the first UAV 800, but the UAVs 800 are about 90° out of phase on their paths 1000 around the ellipse, as described similarly above with respect to FIG. 15B. Accordingly, one UAV 800 is always near point A or point B when the other UAV 800 is at the location with the worst communication performance.

Using two UAVs 800 also facilitates enhanced communication between points A and B despite strong winds. Each UAV's 800 centerline axis 45 should be oriented tangential to the ellipsoid 804. Accordingly, the UAV 800 is prevented from "crabbing" into the wind to maintain an elliptical ground track. The wind therefore pushes the UAV 800 sideways. The UAV 800 must occasionally turn away from an orientation that is tangential to the ellipsoid 804 long enough to return to the elliptical flight path 1000. With one UAV 800, communication between points A and B is interrupted when the UAV 800 flies back to the elliptical flight path 1000. However, with two or more UAVs 800, one UAV 800 can continue to provide communication by flying in an orientation that is tangential to the ellipsoid, while a second UAV 800 flies back to a position along the elliptical flight path 1000.

Figure 20B:
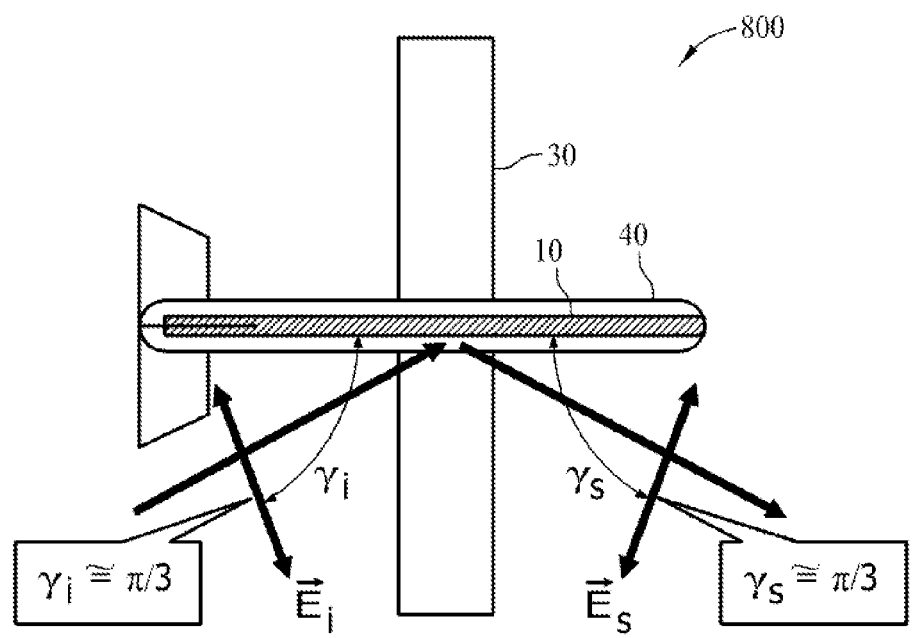
FIG. 20B is a close-up side view of polarization vectors E and polarization angles γ relative to the axis of the passive reflective device of the UAV shown in FIGS. 18A and 18B.

FIG. 20B is a close-up side view of the UAV 800 showing polarization vectors E and polarization angles γ relative to the axis 802 of the passive reflective device 10. In the exemplary embodiment, the fuselage 40 is tangential to the surface of the ellipsoid 804 which passes through the UAV 20 and has points A and B as its foci. Moreover, the UAV 20 flies along the elliptical flight path 1000 around points A and B. As shown, this orients the passive reflecting device 10 so that approximately equals $-\Psi_s$ and neither has a value very close to $\pi/2$. In addition, this orientation ensures that $\gamma_i$ and $\gamma_s$ are substantially less than $\pi/2$. The key to keeping angles $\gamma_i$ and $\gamma_s$ substantially less than $\pi/2$, is maintaining the polarization vector, although nominally vertical at the transmitting antenna, substantially perpendicular to the propagation direction at large distances from the transmitter. Thus, the incident polarization vector $\vec{E}_i$ is tilted away from the vertical when it reaches the UAV 20, and is therefore not perpendicular to the axis 802 of the passive reflective device 10. Likewise the scattered polarization vector $\vec{E}_s$ is tilted away from the vertical when it departs the UAV 20.

Figure 21A:
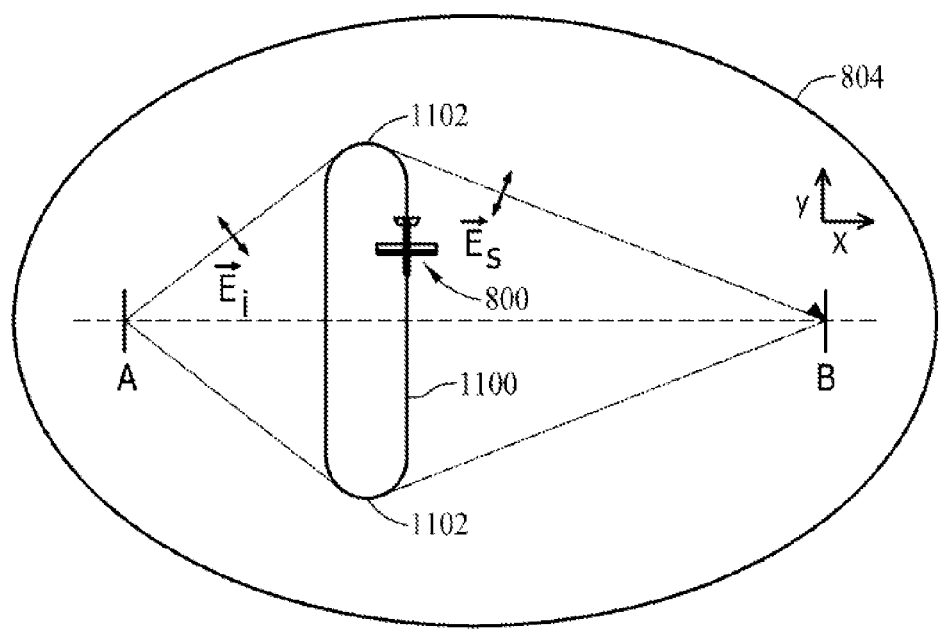
FIG. 21A is a top view that illustrates another flight path for the UAV shown in FIGS. 18A and 18B to enable communication between points A and B using horizontally polarized signals.
Figure 21B:
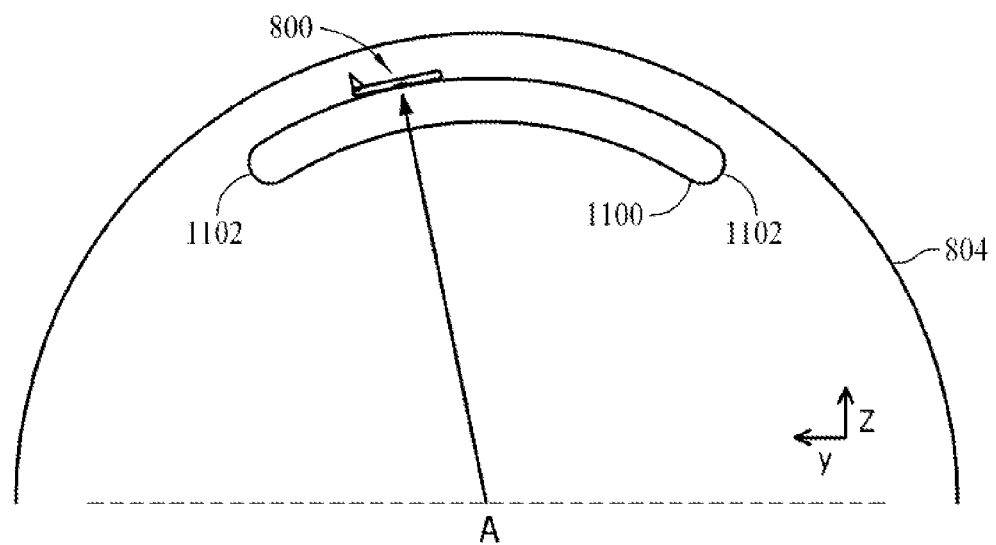
FIG. 21B is an end view of the flight path shown in FIG. 21A.
Figure 21C:
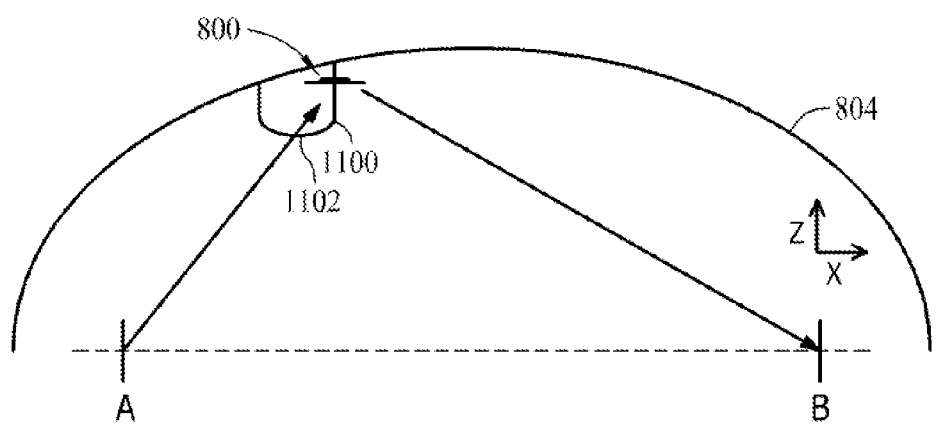
FIG. 21C is a front view of the flight path shown in FIG. 21A.

FIG. 21A is a top view of another exemplary flight path 1100 for the UAV 800 that enables communication using horizontally polarized signals. FIG. 21B is an end view of the flight path 1100, and FIG. 21C is a front view of the flight path 1100.

As illustrated in FIG. 21A, another method for enabling communication between points A and B with signals having horizontal polarization is to control the UAV 800 to fly in a flight path 1100 that is substantially perpendicular to the line segment connecting points A and B. To maintain the passive reflective device 10 in an orientation tangential to the surface of the ellipsoid 804, the UAV 800 cannot fly at a constant altitude. Rather, the UAV 800 climbs up a curved slope on one side of the ellipsoid, and glides down a curved slope on the other side of the ellipsoid 804. The UAV 800 then turns and repeats the cycle from the other side of the ellipsoid 804 as shown in FIGS. 21B and 21C. At each point within the flight path 1100, the passive reflective device 10 remains substantially tangential to the ellipsoid 804 and remains substantially aligned with the incident and scattered polarization of the signal received from the transmitter of point A. It should be recognized that the UAV 800 does not need to be oriented precisely perpendicular to the line connecting points A and B, but rather, the UAV 800 and/or flight path 1100 should minimize an amount of time in orientations where $\cos(\gamma_i)$ or $\cos(\gamma_s)$ approach zero.

It should be recognized that communication between points A and B may be interrupted at each end 1102 of the flight path 1100, as shown by the dash-double-dot lines in FIG. 21A. More specifically, the polarization angles $\gamma_i$ and $\gamma_s$ both pass through $\pi/2$ during each turn, making $\cos(\gamma_i)$ and $\cos(\gamma_s)$ each pass through zero. Accordingly, the scattering cross section is equal to approximately zero during the points in time when the UAV 800 flies through the turns (i.e., at the ends 1102 of the flight path 1100). In a similar manner as described above with reference to the elliptical flight path 1000 shown in FIG. 20A, a user may choose to either tolerate occasional dropouts in the signal communication between points A and B, or may include a second UAV 800.

Method for Vertical Polarization

Figure 22A:
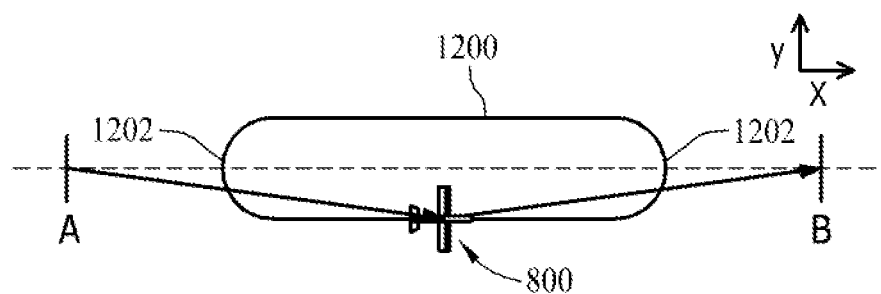
FIG. 22A is a top view that illustrates a flight path for the UAV shown in FIGS. 18A and 18B to enable communication between points A and B using vertically polarized signals.
Figure 22B:
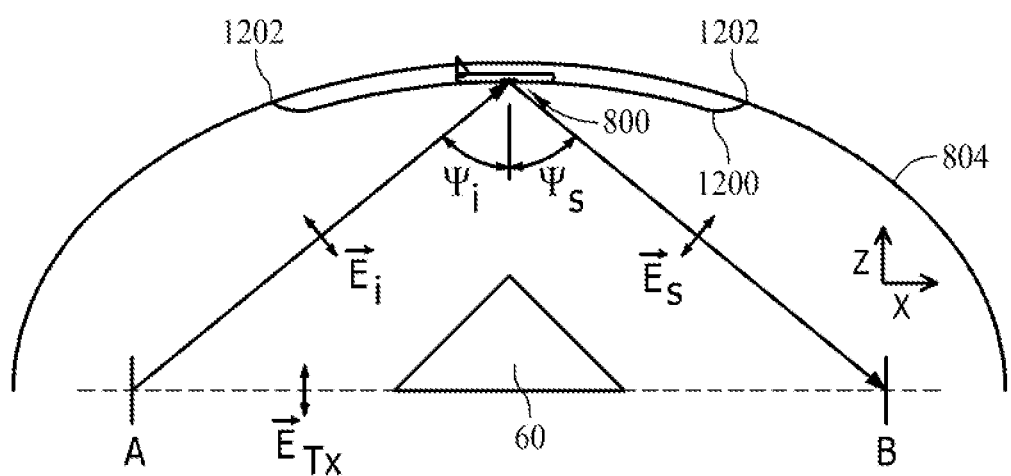
FIG. 22B is a side view of the flight path shown in FIG. 22A.

FIG. 22A is a top view of an exemplary flight path 1200 for the UAV 800 that enables communication using vertically polarized signals. FIG. 22B is a side view of the flight path 1200.

To optimize vertically polarized signal reflection according to the bistatic scattering cross section equation described above with reference to FIG. 2, the long axis 802 of the passive reflective device 10 of the UAV 800 should be substantially vertical and either point A or point B should be higher in elevation than the UAV 800. That is rarely practical for a device embedded in a UAV 800. Rather, the methods for vertical polarization described herein position the passive reflective device 10 at a relative position and orientation wherein the device 10 is at least partly aligned with the polarization vector. An exemplary flight path 1200 that accomplishes this result is shown in FIG. 22A. At all points, or substantially all points, along the elliptical flight path 1200 shown in FIG. 22A, the passive reflective device 10 is tangential to the ellipsoid 804. Though the polarization angles $\gamma_i$ and $\gamma_s$ do not approach zero or it where scattering would be maximized, the angles $\gamma_i$ and $\gamma_s$ also do not approach $\pi/2$ where scattering would be equal to about zero. Thus, the flight path 1200 enables the UAV 800 to reflect a signal from point A at a suitable strength to be received at point B.

In a similar manner to the horizontal polarization methods and flight plans described above, communication between points A and B may be interrupted at each end 1202 of the flight path 1200. In a similar manner, as described above with reference to the elliptical flight path 1200 shown in FIG. 20A, a user may choose to either tolerate such dropouts in the signal communication between points A and B, or may include a second UAV 800.

Method for Circular Polarization

Circular polarization includes a vertically polarized signal and a horizontally polarized signal, with the peak of one carrier wave leading or lagging the peak of the other by 90°. To enable communication between points A and B with circularly polarized signals, the UAV 800 may be flown in any pattern described above for either horizontal or vertical polarization, as long as the passive reflective device 10 is oriented tangential to the ellipsoid 804. However, the signal must be modulated to convey the same data on the horizontal and vertical signal components. For example, the passive reflective device 10 will be oriented to reflect the signal during most of each cycle, but the signal will "drop out" every 180° (i.e., twice in every RF cycle) when the polarization vector is perpendicular to the device 10. The passive reflective device 10 converts the signal from a circular polarized incident signal to a linearly polarized scattered signal. Only about half of the information contained in the signal is reflected to point B (either the vertical component or the horizontal component, depending on the orientation of the passive reflective device 10). By encoding the same data on both the vertical and horizontal components of the circularly polarized signal, the receiver at point B is enabled to receive the full amount of data contained in the signal.

The flight paths 1000, 1100, and 1200 described herein are chosen for simplicity and for clarity of illustration. Other embodiments may include flight paths having a figure-8 shape rather than an elliptical (or "racetrack") path. Moreover, other embodiments may cause the UAV 800 to pitch up or down at either end of the loop and/or to fly inverted for part of the flight path, and/or may cause the UAV 800 to "crab" into the wind for part of the flight path while keeping the passive reflective device 10 oriented substantially tangential to the ellipsoid 804. Moreover, any other method, flight path, and/or flight pattern may be used with any other method, flight path, and/or flight pattern described herein.

Figure 23:
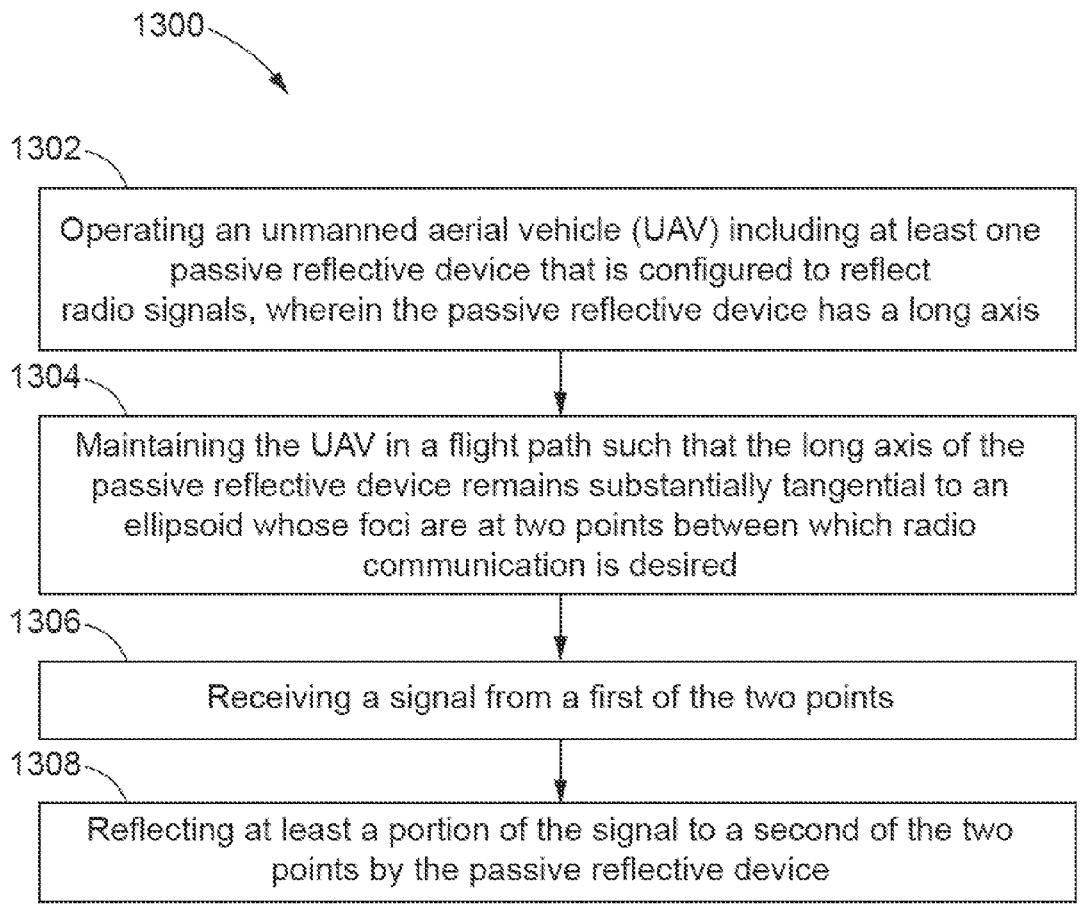
FIG. 23 is a flow diagram of an exemplary method of relaying radio signals between two points.

FIG. 23 is a flow diagram of an exemplary method 1300 of relaying radio signals between two points that may be used with the UAV 800 (shown in FIGS. 18A and 18B) and/or the UAV 20 (shown in FIG. 1).

The method 1300 includes operating 1302 an unmanned aerial vehicle (UAV) 800 including at least one passive reflective device, such as the passive reflective device 10 (shown in FIG. 18A), that is configured to reflect radio signals. The passive reflective device 10 has a long axis 802 that is oriented substantially parallel to the fuselage 40 of the UAV 800. The UAV 800 is maintained 1304 in a flight path such that the long axis 802 of the passive reflective device 10 remains substantially tangential to an ellipsoid whose foci are at two points between which radio communication is desired. In one embodiment, a length of the passive reflective device 10 may be adjusted, such as by extending or retracting the passive reflective device 10 with respect to the fuselage 40.

A signal is received 1306 from a first point, such as point A, by the passive reflective device 10, and at least a portion of the signal is reflected 1308 to a second point, such as point B, by the passive reflective device 10. As such, the UAV 800 enables radio communication between the two points.

In one embodiment, data representative of a location of the two points is received, and the flight path of the UAV 800 is controlled based on the location of the two points. In another embodiment, a control signal is received from a device remote from the UAV 800, and the flight path of the UAV 800 is controlled based on the control signal.

In another embodiment, the UAV 800 is controlled to fly up a curved slope on a first side of the ellipsoid and to fly down a curved slope of a second side of the ellipsoid such that the long axis 802 of the passive reflective device 10 is substantially perpendicular to a line connecting the two points during a majority of the flight path. In yet another embodiment, the UAV 800 is controlled to fly up a curved slope on a first side of the ellipsoid and to fly down a curved slope of a second side of the ellipsoid such that the long axis 802 of the passive reflective device 10 is substantially parallel to a line connecting the two points during a majority of the flight path. In still another embodiment, maintaining 1304 the UAV 800 in the flight path includes operating a plurality of UAVs 800 such that at least one of the UAVs 800 is about 90 degrees out of phase within the flight path of at least one other UAV 800 of the plurality of UAVs 800.

The UAV described herein facilitates enabling communication between radio transmitters and/or receivers separated by an obstacle. The UAV includes a passive reflective device oriented substantially parallel to a fuselage of the UAV. The UAV is controlled by a control system such that the UAV flies along a flight path that enables the passive reflective device to reflect a radio signal from a first point (i.e., point A) to a second point (i.e., point B). More specifically, the flight path maintains the passive reflective device in an orientation that is substantially tangential to an ellipsoid that has points A and B as its foci. In addition, the flight path is adjusted to enable communication between points A and B using radio signals having horizontal polarization, vertical polarization, or circular polarization. Accordingly, the UAV and the flight paths described herein facilitate enabling cost-effective and robust radio communication between points A and B despite the presence of obstacles between points A and B.

Exemplary embodiments of a UAV, a communication system, and methods for relaying a radio signal are described above in detail. The UAV, the communication system, and the method are not limited to the specific embodiments described herein but, rather, components of the UAV and/or system and/or steps of the method may be utilized independently and separately from other components and/or steps described herein. Further, the described operations and/or components may also be defined in, or used in combination with, other systems, methods, and/or devices, and are not limited to practice with only the UAV or the communication system as described herein.

Although the present invention is described in connection with an exemplary UAV, embodiments of the invention are operational with numerous other vehicles, or other systems or devices. The UAV described herein is not intended to suggest any limitation as to the scope of use or functionality of any aspect of the invention. In addition, the UAV described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An unmanned aerial vehicle (UAV) comprising:
    at least one passive reflective device having an elongated configuration defining a long axis and comprising a material configured to reflect radio signals; and
    a control system configured to control said UAV along a flight path that orients said at least one passive reflective device such that said long axis remains substantially tangential to an ellipsoid whose foci are at two points between which radio communication is desired.

2. A UAV in accordance with claim 1, comprising:
    at least one wing; and
    a fuselage coupled to said at least one wing, wherein said long axis of said at least one passive reflective device is oriented substantially parallel to said fuselage.

3. A UAV in accordance with claim 2, wherein said at least one passive reflective device comprises at least one of a strip, a plate, and a wire positioned within said fuselage.

4. A UAV in accordance with claim 2, wherein said at least one passive reflective device comprises at least one of a strip, a plate, and a wire extending outward from said fuselage into ambient air.

5. A UAV in accordance with claim 1, wherein said control system is programmed to receive data representative of a location of the two points and to control the flight path of said UAV based on the location of the two points.

6. A UAV in accordance with claim 1, wherein said control system is programmed to receive a control signal from a device remote from said UAV, said control system is further programmed to control the flight path of said UAV based on the control signal.

7. A UAV in accordance with claim 1, wherein said control system is programmed to control said UAV to fly up a curved slope on a first side of the ellipsoid and to fly down a curved slope of a second side of the ellipsoid such that the long axis of said at least one passive reflective device is substantially perpendicular to a line connecting the two points during a majority of the flight path.

8. A UAV in accordance with claim 1, wherein said control system is programmed to control said UAV to fly up a curved slope on a first side of the ellipsoid and to fly down a curved slope of a second side of the ellipsoid such that the long axis of said at least one passive reflective device is substantially parallel to a line connecting the two points during a majority of the flight path.

9. A method for relaying a radio signal between two points, said method comprising:
    operating an unmanned aerial vehicle (UAV) including at least one passive reflective device configured to reflect radio signals, wherein the at least one passive reflective device has a long axis;
    maintaining the UAV in a flight path such that the long axis remains substantially tangential to an ellipsoid whose foci are at two points between which radio communication is desired;
    receiving a signal from a first of the two points; and
    reflecting at least a portion of the signal to a second of the two points by the at least one passive reflective device.

10. A method in accordance with claim 9, wherein the UAV includes at least one wing and a fuselage coupled to the at least one wing, wherein the long axis of the at least one passive reflective device is oriented substantially parallel to the fuselage, said receiving a signal from a first of the two points comprises receiving the signal by the at least one passive reflective device.

11. A method in accordance with claim 9, further comprising receiving data representative of a location of the two points and controlling the flight path of the UAV based on the location of the two points.

12. A method in accordance with claim 9, further comprising receiving a control signal from a device remote from the UAV and controlling the flight path of the UAV based on the control signal.

13. A method in accordance with claim 9, further comprising controlling the UAV to fly up a curved slope on a first side of the ellipsoid and to fly down a curved slope of a second side of the ellipsoid such that the long axis of the at least one passive reflective device is substantially perpendicular to a line connecting the two points during a majority of the flight path.

14. A method in accordance with claim 9, further comprising controlling the UAV to fly up a curved slope on a first side of the ellipsoid and to fly down a curved slope of a second side of the ellipsoid such that the long axis of the at least one passive reflective device is substantially parallel to a line connecting the two points during a majority of the flight path.

15. A method in accordance with claim 9, wherein maintaining the UAV in a flight path comprises operating a plurality of UAVs such that at least one of the plurality of UAVs is about 90 degrees out of phase within the flight path with respect to at least one other UAV of the plurality of UAVs.

16. A method in accordance with claim 9, further comprising adjusting a length of the at least one passive reflective device.

17. A communications system comprising:
    a first radio transceiver operable for deployment at a first point;
    a second radio transceiver operable for deployment at a second point; and
    an unmanned aerial vehicle (UAV) comprising:
        at least one passive reflective device having an elongated configuration defining a long axis and comprising a material configured to reflect radio signals; and
        a control system configured to control said UAV along a flight path that orients said at least one passive reflective device such that said long axis remains substantially tangential to an ellipsoid whose foci are at the first point and the second point.

18. A communications system in accordance with claim 17, wherein said UAV comprises:
    at least one wing; and a fuselage coupled to said at least one wing, wherein said long axis of said at least one passive reflective device is oriented substantially parallel to said fuselage.

19. A communications system in accordance with claim 18, wherein said at least one passive reflective device comprises at least one of a strip, a plate, and a wire that is at least one of positioned within said fuselage and extending outward from said fuselage into ambient air.

20. A communications system in accordance with claim 17, wherein said UAV is a first UAV of a plurality of UAVs, said plurality of UAVs is operated in a flight path such that at least one of said plurality of UAVs is about 90 degrees out of phase within the flight path with respect to at least one other UAV of said plurality of UAVs.

* * * * *